United States Patent [19]
Ensley

[11] 4,000,036
[45] Dec. 28, 1976

[54] PLASMA CONTROL AND UTILIZATION
[75] Inventor: Donald L. Ensley, Danville, Calif.
[73] Assignee: The United States of America as represented by the Energy Research and Development Administration, Washington, D.C.
[22] Filed: Jan. 21, 1971
[21] Appl. No.: 108,521

Related U.S. Application Data
[63] Continuation-in-part of Ser. No. 67,697, Aug. 28, 1970, abandoned.
[52] U.S. Cl. .................................. 176/1; 176/3; 315/111
[51] Int. Cl. .......................................... G21b 1/00
[58] Field of Search .............................. 176/1-9; 315/111

[56] References Cited
UNITED STATES PATENTS

| | | | |
|---|---|---|---|
| 3,022,236 | 2/1962 | Ulrich et al. | 176/1 |
| 3,031,399 | 4/1962 | Warnecke et al. | 176/2 |
| 3,105,803 | 10/1963 | Weibel | 176/1 |
| 3,120,477 | 2/1964 | Hatch | 176/1 |

OTHER PUBLICATIONS

Annular Review of Nuclear Science, vol. 20, (1970) p.

Primary Examiner—Harvey E. Behrend
Attorney, Agent, or Firm—D. Carl Richards; Randall G. Erdley

[57] ABSTRACT

A plasma is confined and heated by a microwave field resonant in a cavity excited in a combination of the TE and TM modes while responding to the resonant frequency of the cavity as the plasma dimensions change to maintain operation at resonance. The microwave field is elliptically or circularly polarized as to prevent the electromagnetic confining field from going to zero. A high Q chamber having superconductive walls is employed to minimize wall losses while providing for extraction of thermonuclear energy produced by fusion of nuclei in the plasma.

24 Claims, 15 Drawing Figures

INVENTOR:
DONALD L. ENSLEY

Richards, Harris & Hubbard
ATTORNEYS

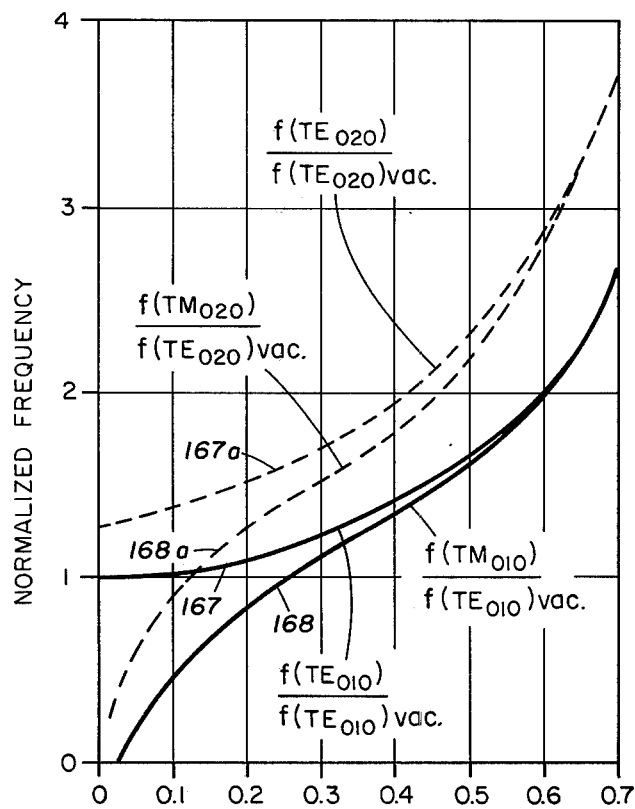
FIG. 2
FREQUENCY VARIATION WITH PLASMA FILLING IN OPERATING MODE. METALLIC WALL ASSUMED FOR PLASMA BOUNDARY.
FIG. 14
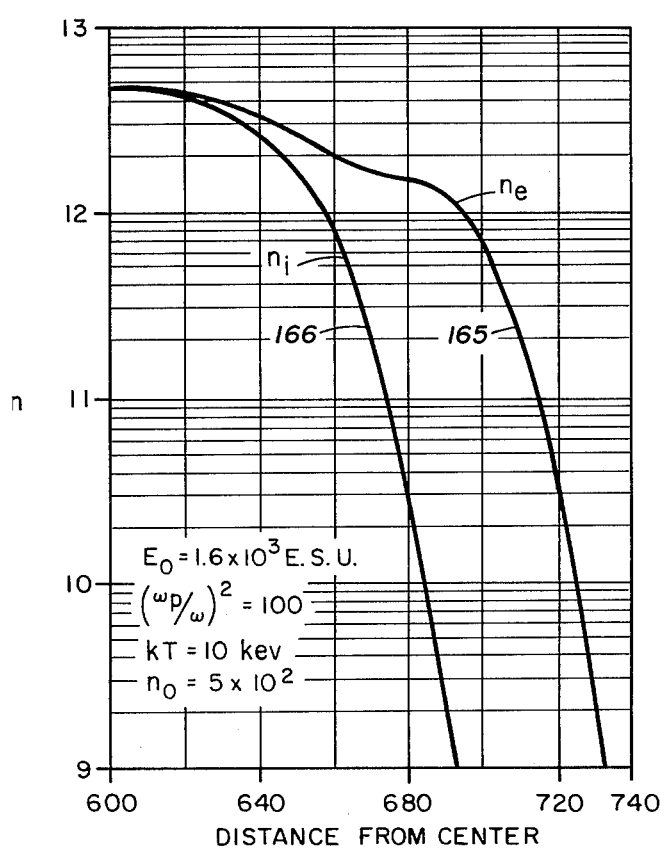
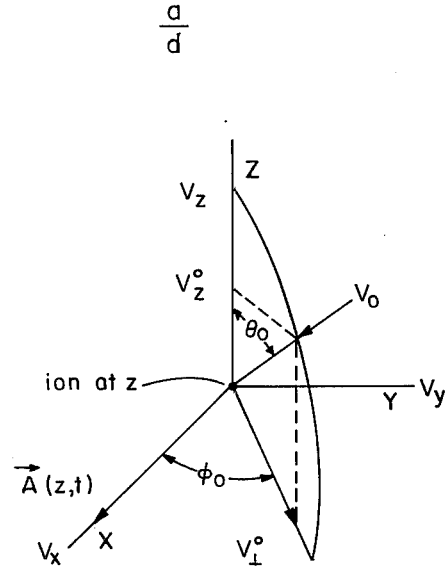
FIG. 3
INVENTOR
DONALD L. ENSLEY
ATTORNEYS

INVENTOR:
DONALD L. ENSLEY

Richards, Harris & Hubbard
ATTORNEYS

INVENTOR:
DONALD L. ENSLEY

Richards, Harris & Hubbard
ATTORNEYS

FEEDS SPACED 90°
IN φ TO ELIMINATE

FEEDS SPACED 180°
IN φ TO ELIMINATE

INVENTOR:

DONALD L. ENSLEY

Richards, Harris & Hubbard

ATTORNEYS

COAXIAL TE MODES
FREQUENCY VARIATION
WITH PLASMA FILLING
METALLIC WALL ASSUMED
FOR PLASMA BOUNDRY

INVENTOR:
DONALD L. ENSLEY

Richards,
Harris & Hubbard
ATTORNEYS

PLASMA CONTROL AND UTILIZATION

This application is a continuation-in-part of application Ser. No. 67,697, filed Aug. 28, 1970, now abandoned.

This invention relates to the confinement and use of a thermonuclear plasma. In a further aspect, it relates to fusion reactor methods and systems wherein an rf fluid confines and heats the plasma by establishing and maintaining a standing electromagnetic wave within a container as a circularly polarized field where the E field of the wave is parallel to the container wall, near zero at the wall and has at least one minimum in the region enclosed by the wall.

Attempts to confine a thermonuclear plasma have heretofore been undertaken through the use of steady magnetic fields, radio frequency fields and combinations thereof. The problem has been to be able to establish and maintain an environment in which the plasma could be confined at an elevated temperature and pressure such that nuclear fusion would take place for the production of thermonuclear power. No operation has been sustained in the range or for the period necessary to net power production.

Some of the problems encountered in attempts to evaluate the possibility of net power gain from a system employing nuclear fusion are discussed in "The Radio Frequency Confinement and Acceleration of Plasmas" by Watson et al, *Electron Physics*, Vol. 23, 1967, p. 153 et seq. In spite of the impediments there recognized, advances in three areas giving rise to optimism not theretofore entertained were noted. The three areas were: First, the upper limit on the *rf* power available at any given frequency had increased so that, for example, megawatts of cw power were available in the 10cm waveband. Second, the Q factors of cavities had been raised by over five orders of magnitude by constructing them from superconducting metals kept at 2° K. Third, it was known that there existed equilibria in which the ratio of the volume filled by plasma to the volume filled by *rf* could in principle be made very large.

In a paper entitled "Thermonuclear Reactor With a Plasma Column Hovering Freely in a High-Frequency Field" by P. L. Kapitsa, translated and published by the Clearinghouse For Federal Scientific and Technical Information, Springfield, Virginia, (JPRS 50255, Apr. 7, 1970) a major problem, heating of ions, was proposed to be overcome by magnetoacoustic oscillation.

Applicant has discovered that stable confinement of a heated plasma may be achieved by control of the degree of polarization augmented when necessary with energy feedback. This requires both a fast time scale nonlinear response as well as effects of the collective motion in modifying the standing wave field on the slower time scale such that the dynamic boundary conditions for collective stability can be maintained. This latter feature is achieved by feedback technique and by the natural response of the boundary region. At the same time, continuous microwave power of the order of $1 \times 10^6$ watts at wavelengths of the order of ten centimeters in a configuration to confine the plasma will heat the ions.

A confinement relation, when satisfied will allow the maintenance of a plasma and a microwave field in thermodynamic equilibrium while at the same time supplying energy to keep the plasma hot. Operations satisfying the confinement relation in a container whose walls are superconductive minimizes wall losses to permit net power gain in a fusion reactor.

In accordance with the invention, continuous electromagnetic energy is applied to establish a circularly polarized standing electromagnetic wave in a superconductive walled container which is filled with a gas to a plasma density of the order of $10^{13}$ to $10^{14}$ atoms/cc. The E field of the standing electromagnetic wave is parallel to the wall of the container, near zero at the wall of the container, and passes through a minimum in the region enclosed by the wall. The frequency of the electromagnetic energy is maintained such as to satisfy the resonant condition that the total electric field energy equals the total magnetic field energy inside the container. Under such conditions, the electromagnetic energy performs work to heat the gas. Because of the interaction between the particles and the standing electromagnetic wave in the container, the plasma is contained.

In a preferred embodiment of the invention, an ionized plasma is formed and confined in a toroidal chamber excited by energy from a high power microwave generator, preferably in the $TE_{010}$ and $TM_{010}$ modes, or in the $TE_{020}$ and $TM_{020}$ modes. Means are further provided for introducing gas into the container and for concurrently controlling the variation in the frequency of the output of the generator to follow the change in resonant frequency of the chamber as the collective behavior of the gas ionized by the field dominates the individual particle behavior and modifies the microwave field.

For a more complete understanding of the present invention and for further objects and advantages thereof, reference may now be had to the following description taken in conjunction with the accompanying drawings in which:

FIG. 2 illustrates variations in operating frequency of the cavity relative to TE and TM modes as the cavity is filled;

FIG. 3 illustrates angles involved as an electron approaches the confining field from the interior of the cavity;

FIG. 14 is a graph illustrating charge separation in the plasma boundary; and

The present invention is directed to the control of a plasma for the purpose of effecting a net power gain in a nuclear fusion reaction. The present description will be directed toward one embodiment of such a system. Following this description, modifications will then be treated. The system described represents a particular operation wherein deuterium and tritium are introduced into a toroidal container and confined and heated within the toroidal container by circularly polarized microwave energy maintained at the resonant frequency of the chamber as excited preferably in a combination of the $TE_{010}$ and the $TM_{010}$ modes, or the $TE_{020}$ and $TM_{020}$ modes.

Figure 1:
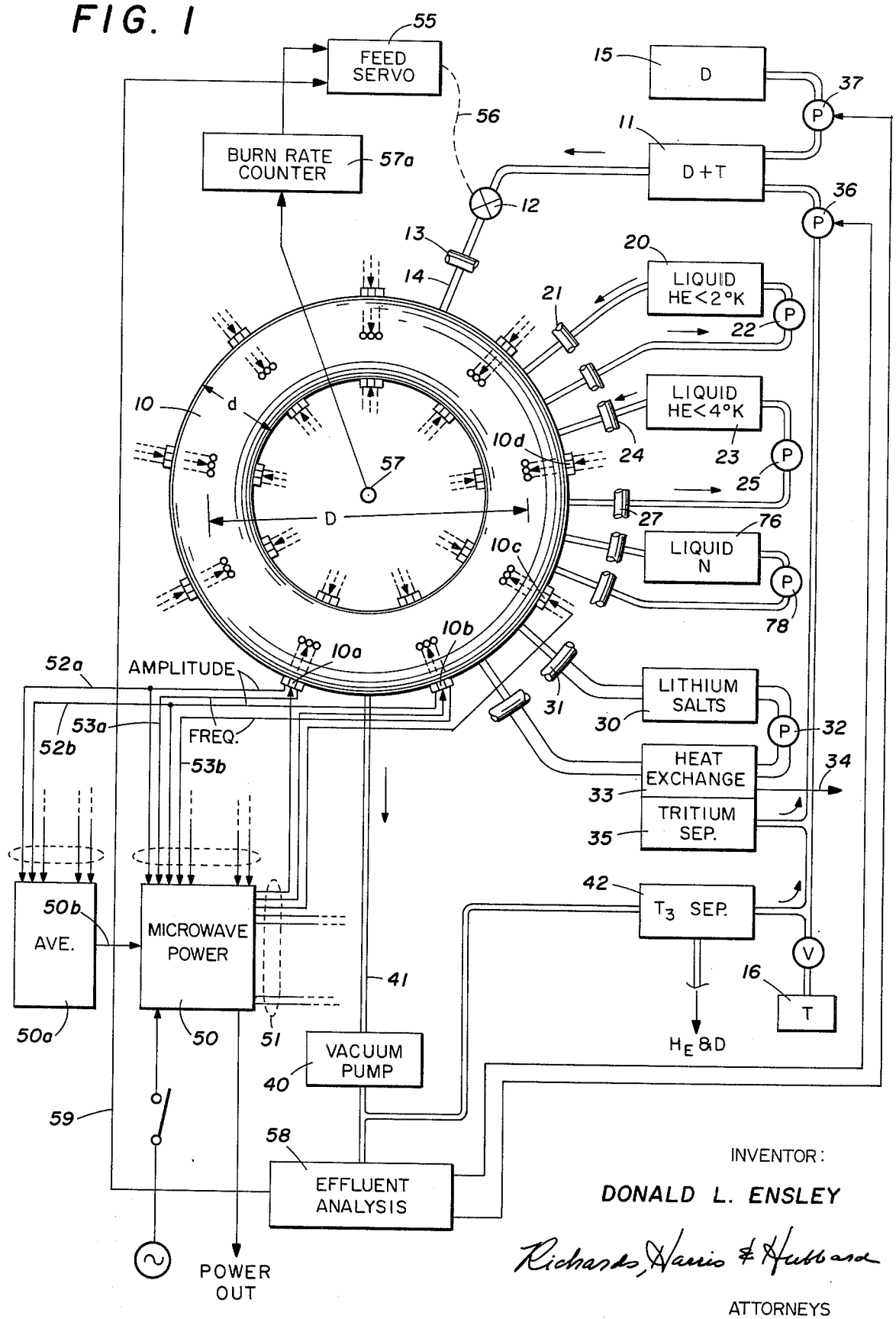
FIG. 1 illustrates one embodiment of the invention where a toroidal resonant cavity is employed.

FIG. 1 illustrates a reactor for utilization of deuterium and tritium, controlled to provide a net power gain through the nuclear fusion. In FIG. 1, a multiwall toroidal cavity 10 is employed. It may have a ring diameter D of the order of 10–50 meters. The tube diameter d may be of the order of 1–3 meters. The cavity 10, having a superconductive inner wall, is provided with a mixture of deuterium and tritium from a tank 11 by way of a control valve 12 which feeds a manifold 13. A plurality of flow channels, such as the channel 14, extend from manifold 13 into the cavity 10 to provide a selected concentration of the deuterium-tritium mixture within cavity 10. Deuterium is supplied to tank 11 from a tank 15. Tritium is supplied to tank 11 from a tank 16. Flow to tank 11 is so controlled as to maintain a mixture of approximately equal parts of deuterium and tritium in the cavity.

A refrigerant, liquid helium at less than 2° Kelvin is supplied from a source 20 by way of the manifold 21 to maintain the wall of cavity 10 preferably at about 1.85° Kelvin. Liquid helium from source 20 is circulated by a pump 22 through a toroidal shell-like zone around the wall of cavity 10 as will be described in connection with FIG. 7.

Liquid helium maintained at a temperature of about 4° Kelvin is supplied to a second zone, outside the first refrigerating zone, by way of a manifold 24 and circulated by way of pump 25. Liquid nitrogen from a source 26, is supplied to form a third blanket or layer by way of a manifold 27, circulated by pump 28. Finally, an outer circulating blanket of a liquid salt absorbs neutrons from the plasma and produces tritium. This blanket is circulated from a source 30 by way of a manifold 31. It is circulated by a pump 32 through a heat exchanger 33 whereby energy in the form of heat produced upon absorption of neutrons is available for utilization as output power as indicated by channel 34.

The heat exchanger 33 has a tritium scavenging unit 35 associated therewith. Tritium produced in the salt blanket will be utilized through the flow controller 36 leading to the DT tank 11. The tritium required for maintaining operation of the reactor, after initial start up, will be supplied from the scavenger 35. Flow controller 37 for the deuterium supply 15 operates in conjunction with flow controller 36 to maintain the desired relative concentration of deuterium and tritium in the unit 11.

A vacuum pump 40 provides for withdrawal of gases from container 10 by way of channel 41 and to feed a scavenger 42 to recover unburned tritium from the gases withdrawn from the reactor.

Microwave power source 50, FIG. 1, is connected to a plurality of feed points on the container. The connections between the power source 50 and the feed points are through use of channels 51. Source 50 is a multichannel source with separate feed lines $51a$, $51b$, $51c$. . . $51n$ leading to separate feed points $10a$, $10b$, $10c$. . . $10n$ of the cavity 10. Microwave power is applied to the cavity at a frequency such that the wavelength will be of the order of from 10 to 30 cms. Feedback channels $52a$ and $53a$ associated with feed point $10a$ apply amplitude and frequency inputs to the source 50. Similar feedback channels extend from sensors associated with feed points $10c$. . . $10n$. An average amplitude reference signal is generated from all the channels 52 and employed by source 50 for comparison with each amplitude signal for local control. More particularly, lines $52a$, $52b$. . . $52n$ are all connected to a unit $50a$ which produces on output line $50b$ a signal representative of the average of the signals on lines $52a$, $52b$. . . $52n$.

In operation, the cavity preferably will be excited in a combination of TE and TM modes. The resultant microwave field will be circularly or elliptically polarized. A field described herein as circularly polarized will be taken to include the elliptical case unless otherwise specified. Certain results flow from the use of elliptical polarization as compared with truly circular polarization.

The resonant frequency of a mode for the cavity 10 is dependent upon the cavity dimensions. In FIG. 2 curve 167 has been plotted which is the ratio of the resonant frequency in the $TE_{010}$ mode showing it to be dependent upon plasma diameter. The abscissae represent the ratios of various values of the plasma diameter to the cavity diameter. Curve 167 represents variations in the ratio of the resonant frequency $f(TE_{010})$, with plasma present, to the resonant frequency $f(TE_{010_{vac}})$ under vacuum conditions (with no plasma). Curve 167 thus shows that as the plasma grows, the resonant frequency for the $TE_{010}$ mode increases.

Curve 168 illustrates the variation in the ratio of resonant frequency for the $TM_{010}$ mode to the resonant frequency for the $TE_{010}$ mode when the latter is under vacuum conditions. Curve 168 indicates that the $TM_{010}$ mode does not exist or cannot be sustained in cavity 10 in the vacuum condition. Only if there is some plasma can the $TM_{010}$ mode exist. Only when curve 168 closely approaches curve 167 can the system be locked in to both the $TE_{010}$ and $TM_{010}$ modes at the same frequency thereby to establish the sustain operation in a circularly polarized mode.

When cavity 10 is to be initially excited in start up operations, the microwave power is supplied only in the $TE_{010}$ mode. After some plasma has formed such that $\omega/\omega_p$ 1, the $TM_{010}$ resonant mode is excited. The ratio $\omega/\omega_p$ is the ratio of the circular frequency ($\omega$) of input radiation to the electron plasma frequency ($\omega_p$). Only after the cavity is filled with plasma to about 0.6 of its diameter do the curves 167 and 168 nearly coalesce. At this point the excitation of the $TM_{010}$ mode may be phase locked to the $TE_{010}$ mode. Thereafter circular polarization can be maintained.

In FIG. 2 it is also noted that the curves $167a$ and $168a$ coalesce after the plasma occupies about 0.6 of the diameter of the cavity so that operation may be phase locked in the $TE_{020}$ and $TM_{020}$ modes.

After a field having circular polarization is established, then the microwave power applied to the system from source 50 is increased to such point that the confined gas will be heated by the field to the temperature at which nuclear fusion will take place so that a net energy gain may be realized.

In such a field, stimulated emission of bremsstrahlung exactly balances the random impulses which the coherent radiation field attempts to give the electrons, provided only that a simple relationship between the radiation wavelength, a characteristic system length and plasma frequency is satisfied.

The conditions for thermodynamic equilibrium are independent of both the radiation intensity and the plasma temperature for the self-consistent confining fields. The natural scale length provided by the physics alone is in the range for a useful thermonuclear machine (~ one meter). This also is the approximate scale necessary for resistive heating to raise the plasma temperature into the thermonuclear range.

So called micro-instabilities heretofore observed in plasma are believed to be a direct result of a lack of thermodynamic equilibrium. Every time a given instability mode has been remedied, another mode has appeared representing the next easiest route for the system to decay toward thermodynamic equilibrium. There are probably an infinite number of these paths.

Applicant has found that a plasma may be confined and heated by circularly polarized microwave radiation. The selfconsistent confining radiation stimulates free-free bremsstrahlung transitions into the coherent confining mode. Einstein discussed thermodynamic equilibrium between matter and radiation in his historic paper, "Zur Quantentheorie der Strahlung" Physik. Z. 18, p. 121, Mar. 3, 1917. In the present case coherent microwave radiation replaces the Planck distribution and free-free electron transitions rather than the transitions between bound states are involved. Consistent therewith, applicant has found that the random scattering impulses given the electrons by the time dependent fluctuations in the radiation are radiated back into the confining mode at the appropriate rate as above noted. The relationship is independent of both plasma temperature and the intensity of the confining radiation. A plasma-field system in thermodynamic equilibrium may therefore be established in container 10, FIG. 1, with no so-called micro-instabilities. Direct conversion of nuclear to microwave energy by stimulated emission of charged burn products into the coherent confining mode is thus possible for controlled fusion power generation.

Heretofore there has been lacking the ability to balance the Einstein identity in thermonuclear machines based upon any of the various quasi-steady magnetic field concepts. This is simply a result of the fact that unlike microwaves which can both confine and heat in thermodynamic equilibrium, a magnetic field cannot heat and always requires large fluctuating fields to attempt to heat the plasma. This invariably causes large stochastic effects, throwing the system out of thermodynamic equilibrium. Since approximately one percent of the thermal energy content per second would have to be provided by these other means, there would seem to be a fundamental question for the quasi-steady magnetic field schemes.

D. Marcuse in "Stimulated Emission of Bremsstrahlung", B.S.T.J. 41, Sept. 1962, pp. 1556–1571, computed the cross section for stimulated emission of bremsstrahlung in which the exact Coulomb wave function derived by A. Sommerfeld, *Atombau und Spektralliniew*, Vol. II. Friedr. Vieweg Und Sohn, Braunschwien, 1960, pp. 501–505, were used to eliminate the restrictions of the Born approximation in computing the matrix elements of the Coulomb potential. The results of the quantum electrodynamics are summarized below: The cross section is, $$\sigma = \frac{4e^6 N_{ph}}{m_e^3 v_e^4 v^2} \left[ (3\cos^2\phi\sin^2\theta - 1) \ln \frac{2m_e v_e^2}{h\nu} - 2\cos^2\phi\sin^2\theta \right] \quad (1)$$

with the only relevant parameters valid for the present purposes, namely; $h\nu/m_e v_e^2 \gg 1$. The range of electron velocities of physical interest are those corresponding to the ion thermal velocity as lower limit and the confining well as upper limit. The cross section is valid over this entire range.

$N_{ph}$ = number of photons per unit volume initially present in the mode corresponding to frequency $\nu$ and polarization of $\vec{A}$ $\nu$ = frequency of the radiation field $m_e$ = mass of electron $v_e$ = velocity of the incident electron e = electron charge The angles involved are shown in FIG. 3.

The cross section gives emission for $\sigma_T > 0$ and absorption for $\sigma_T < 0$. Analysis shows the emission to take place in a cone of 108° centered along $\vec{A}$. For the case of circular polarization, the corresponding situation is an emission cone spinning about the Z axis with angular frequency $\omega = 2\pi\nu$.

Figure 4:
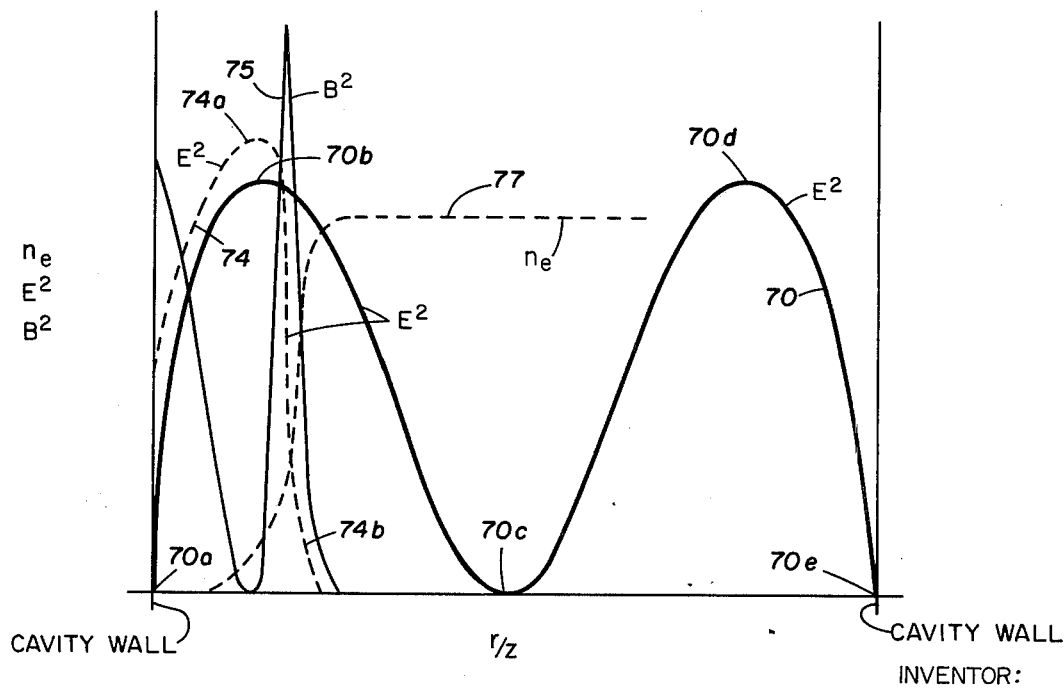
FIG. 4 is a graph illustrating the confining field configuration.

Microwave confinement and heating of a plasma is carried out by self-consistent field equilibria in which the fields and particles behave as in FIG. 4. Detailed information about the nonlinear field-particle boundary region is obtained by numerical solution of the self-consistent field equations including relativistic effects. Only the general qualitative behavior obtained from these calculations need be understood. For simplicity consider the case of circularly polarized standing radiation with propagation along the Z axis. The classical field vectors are then in the X–Y plane. In the actual toroidal fields the radial coordinate corresponds to Z with the axial and tangential cylinder coordinates corresponding to X and Y. Parameters X, Y and Z are represented in the toroidal configuration by the terms r, $\phi$ and Z. No essential physics is changed either by this coordinate transformation or nonrelativistic approximations to the equations of motion. For the cases of interest, a toroidal geometry with a cross section ~1 meter will be heated to the approximate temperature of 35 kilovolts, suitable for thermonuclear energy production. The main features are:

Peak $B^2$ occurs in z at the inflection point of the number density, which is also the turning point of a thermal electron $$\left[ \frac{E^2 + B^2}{8\pi} \right]_{\substack{\text{vac.} \\ \text{region}}} = (2n_e kT)_{\text{inside}} \quad (2)$$

$$\frac{1}{2} m_e v_z^2 = \frac{e^2 E^2}{4m_e \omega^2} \quad (3)$$

$$n = n_e e^{-\epsilon}; \quad \epsilon = \frac{m_e v_z^2}{2kT}$$

where this last relation is a result of the quasi-neutral approximation for the plasma potential.

Near the boundary region of field and plasma, $B^2 \gg E^2$, also, in general across the boundary one has $$2nkT + \frac{E^2 + B^2}{8\pi} = 2n_e kT \tag{4}$$

where $n_e$ is the density of electrons in the hot core, where the field is excluded. The force equation for an electron is:

$$F_z(t,\delta) = m_e \ddot{z} = e \frac{\partial \Phi}{\partial z} - \frac{e^2}{2m_e} \frac{\partial}{\partial z} A^2$$

$$+ \frac{e}{m_e} \frac{\partial}{\partial z} A[P_x \cos(\omega t + \delta)$$

$$+ P_y \sin(\omega t + \delta)] + F_r(t) \tag{5}$$

where
$\vec{A}$ = vector potential = $A_{(z)}(i \cos \Omega t + j \sin \Omega t)$,
$F_r(t)$ = radiation force, and
$\Phi_{(z)}$ = plasma potential.

The dominant radiation force is due to stimulated emission of bremsstrahlung in the turning point region or skin region. Each electron in traversing back and forth across the well is deflected by hitting other particles and has a characteristic self deflection time, $\tau_{ee}$. From Equation (5), neglecting the radiation forces, one obtains for the time dependent forces of photon scattering, $$\widehat{\Delta P}^2(t,\delta) = [F(t,\delta)\tau]^2; \quad \tau = \text{turning time}$$

$$\widehat{\Delta P}^2 = \left(\frac{e}{m_e \omega}\right)^2 \left(\frac{\partial E}{\partial z}\right)^2 \tau^2 [P_x^2(t) \cos^2(\omega t + \delta)$$

$$+ P_y^2(t) \sin^2(\omega t + \delta)]$$

Assuming a Maxwellian distribution with random phases, there is obtained a $\widehat{\Delta P}^2$ which varies with time from zero (normal incidence, $P_x = P_y = 0$) to a maximum over $\tau_{ee}$. The average of this leads to a random spread in energy of $$\widehat{\Delta P}^2 = (3kT) \frac{m_e}{9} \tag{6}$$

where the turning time is $$\tau^2 = m_e \left(\frac{\partial F}{\partial z}\right)^{-1}$$

which, using Equation (5)

$$\tau^2 = 2 \left(\frac{m_e \omega}{e}\right)^2 \left(\frac{dE}{dz}\right)^{-2} \tag{7}$$

and was used to arrive at Equation (6).

The turning time defined and used above is essentially the linear velocity approximation from rest at the turning point to the initial normal component velocity of approach. This time turns out to be within a few percent of the more accurate values obtained from detailed numerical orbit calculations.

The average value of the cross section, Equation (1), over a turning point, is $> 0$. This follows directly from the confinement condition of an electron. Suppressing factors of particle energy or constants, Equation (1) is $$\langle \sigma_T \rangle_{T.P.} = \frac{1}{\tau} \int_0^\tau (N_{ph}) \tau [3 \cos^2 \phi_T \sin^2 \theta - 1] dt'$$

using $$(N_{ph})_\tau = \frac{B^2(t' = \tau)}{8\pi h\nu} = \text{const.} \, \tau^{-2}$$

one has $$\langle \sigma' \rangle_{T.P.} = \frac{\text{const.} \, \tau^{-2}}{\tau}$$

$$\int_0^\tau \left[ 3 \cos^2 \phi_T \left(1 \frac{v_z^2}{v^2}\right) - 1 \right] dt'$$

$\phi_T$ is the angle between the velocity vector and the vector potential $\vec{A}$ at the turning point.

$$\cos^2 \phi_T = \frac{\left[\hat{e} \cdot \vec{v}_T\right]^2}{|\vec{v}_T|^2}$$

$$\hat{e} = \frac{\vec{A}}{|A|} (z,t)$$

$$\vec{v}_T = \vec{v}' + \vec{v}_\perp^0$$

$$\vec{v}' = \frac{eE_T}{m_e \omega} \hat{e}$$

$$\vec{v}_\perp^0 = v_0 [i \sin \theta_0 \cos \phi_0 + j \sin \theta_0 \sin \phi_0]$$

which leads to $$\cos^2\phi_T = \frac{1 + \left(\sqrt{2/2}\right)\tan\theta_0\cos(\phi_0 - \omega t) + \frac{1}{2}\tan^2\theta_0\cos^2(\phi_0 - \omega t)}{1 + \left(\sqrt{2/2}\right)\tan\theta_0\cos(\phi_0 - \omega t) + \frac{1}{2}\tan^2\theta_0}$$

Hence, the average cross section ($<\sigma_T>$) becomes, after averaging over all initial angles of incidence, $$<\sigma_T> = \frac{3e^6 N_{ph}}{m_e^3 v_e^4 v^2}\left[\ln\frac{2m_e v_e^2}{h\nu} - 1\right] \quad (8)$$

the logarithm varies only slowly ($\sim$ factor of 3) and is replaced by its average value of 24. Equation (8) is 3/8 of the maximum value along the cone axis of Equation (1). The rapid drop-off of field towards the plasma interior insures that there is negligible absorption of photons during the approach to the turning point. There is for instance less than one tenth the absorption probability for an electron two turning times away from the turning point than for one turning time. The energy emitted per second by an electron in an encounter with the confining well is then $F_e v_e = h\nu\Delta N$, where $\Delta N =$ number of photons emitted per second. Defining the radiation reaction force $R_e(\epsilon)$ by $F_e = R_e v_e$ and using the above cross section $$R_e(\epsilon) = \frac{\gamma 36(2\pi)^2 n_i^2 e^6}{\omega^2 (2m_e)^{1/2}(kT)^{3/2}} \frac{e^{-2\epsilon}(1-e^{-\epsilon})}{\epsilon^2}$$

integrating this function over the distribution of incident electron energies and system volume, where the incident electron distribution function is $$f_e(\epsilon) = \frac{2}{\sqrt{\pi}}\epsilon^{1/2}e^{-\epsilon}$$

one obtains $$R_e = \frac{\gamma(36)(2\pi)^2 n_i^2 e^6}{\omega^2 \sqrt{m_e}(kT)^{3/2}} \quad (9)$$

with $$\gamma = \frac{\text{thermal skin volume}}{\text{system volume}}$$

S = surface area
Thermal skin volume = $\delta S$
$\delta$ = thermal skin depth $$= \frac{\lambda}{2\pi}\left(\frac{\omega}{\omega_p}\right)$$

$\gamma$ takes into account the fact that the electron only spends a small time radiating at the turning point, compared to the crossing time. Also used were:
Incident electron flux = $n_e e^{-\epsilon} v_e$
Number of ions in scattering region = $n_i \delta S \epsilon^{1/2} e^{-\epsilon}$ $$N_{ph} = \frac{B^2(z)}{8\pi h\nu} = \frac{2kT}{h\nu}n_i(1-e^{-\epsilon})$$

$$\text{skin depth } \delta(\epsilon) = \frac{\lambda}{2\pi}\left(\frac{\omega}{\omega_p}\right)\epsilon^{1/2}$$

Einstein proved, in his 1917 paper, that stimulated emission as well as absorption was required if thermodynamic equilibrium were to exist between matter and radiation. His discussion shows in general that if the particles are given random momenta by the radiation field $(\widehat{\Delta P})^2$, and if a force representing the particle giving energy back to the radiation exists ($R_e$) then averaging over the net momentum fluctuations long enough to obtain an average ($\tau_{\epsilon\epsilon}$) if thermodynamic equilibrium is to exist, the following relation must be satisfied:

$$[m_e v_e - R_e v_e \tau_{\epsilon\epsilon} + \widehat{\Delta P}]^2 = \widehat{(m_e v_e)^2}$$

From Equation (5)

$$\widehat{\Delta P} = 0; \quad \widehat{\Delta P^2} \quad 0 \neq (3kT)\frac{m_e}{9}$$

This leads to Einstein's famous identity, valid here also, $$\frac{\widehat{\Delta P^2}}{2R_e \tau_{\epsilon\epsilon}} = 3kT \quad (10)$$

using Equation (6) and Equation (9) in Equation (10), and noting the well known self deflection time for an electron $$\tau_{\epsilon\epsilon} = \frac{m_e^{1/2}(2kT)^{3/2}}{4\pi n_i e^4 \ln g}\left[\phi(1) + 2 + \frac{2}{e\sqrt{\pi}}\right]$$

with ln g the usual coulomb logarithm $$\frac{(3kT)\ln g}{54\gamma}\left(\frac{\omega}{\omega_p}\right)^2 = 3kT$$

which establishes the relationship between the plasma density ($\omega_p$) system characteristic length ($\gamma$) and radiation wavelength ($\omega$) required for thermodynamic equilibrium, namely $$\frac{\ln g}{54\gamma} \left(\frac{\omega}{\omega_p}\right)^2 = 1 \qquad (11)$$

Equation (11) will be called the Einstein confinement relation. The characteristics that are most interesting about this relationship are its independence of both temperature and radiation intensity. Equation (11), based solely upon the physics of the fields, particles and the interactions between them, predicts a characteristic length which is of the order of one meter. To see this more clearly for the range of parameters applicable to controlled fusion power production:

$$n_i \sim 5 \times 10^{13} \text{ ions/cm}^3$$

using $$\gamma = \frac{\lambda}{2\pi} \left(\frac{\omega}{\omega_p}\right) \frac{S}{V}$$

Equation (11) is:

$$(\ln g) \left(\frac{V}{S}\right) \frac{1}{54} \frac{\omega^2}{c\omega_p} = 1$$

where:
 $(\omega/\omega_p) \simeq .1$;
 $S$ = surface area of the system;
 $V$ = volume of the system;
 $c$ = light speed; and
 $\lambda$ = confining radiation wavelength.

With the above range of parameters a characteristic length of the order of one meter results, the size employed herein for the controlled fusion machine. Variation of the parameters over a wide range is, of course, possible with Equation (11) remaining satisfied.

The microwave power source 50, FIG. 1, is preferably dynamically controlled in order to maintain the standing waves at resonance within cavity 10 and of amplitude such that a ring shaped plasma will be confined, spaced from the chamber walls while occupying a significant major portion of the volume of the container 10.

In the control of source 50, a first feedback channel 52a senses the amplitude of magnetic field at the wall of the container and thereby determines the amplitude of the electric field in the cavity 10 due to the standing waves therein. Source 50 is controlled as to maintain the amplitude of the field within predetermined limits.

A second feedback channel 53a senses the frequency of the magnetic field in cavity 10 to control the frequency of the power from generator 50 to maintain the excitation of the cavity 10 at resonance even though the resonant frequency may change in response to variations in the dimensions of the plasma.

An input feed servo unit 55 serves to control valve 12 by way of linkage 56 in response to the variations in the field in container 10. Servo unit 55 is connected at its input to respond to a radiation detector 57 by way of a burn rate counter 57a. Detector 57 is shown located at the center point of the toroid of cavity 10. It may be a boron trifluoride neutron counter, a Geiger counter or a gamma ray detector. Detector 57 provides one input to the servo feed control unit 55 to aid in determining burn rate, by way of burn rate counter 57a. Further, an analyzer 59 provides for control of valves 36 and 37 to maintain the desired percentage of D and T fed to the reactor. It is desirable to maintain the burn no greater than about 50%. Feed control servo 55 maintains an optimum fuel mixture in container 10 in dependence upon burn rate as determined by the output of detector 57.

Deuterium and tritium fed to the cavity by way of conduit 14 are immediately ionized. Helium ions, a part of the products of fusion, become highly charged during the burn and normally would be confined by the radiation field in cavity 10. However, the electromagnetic radiation in the system may be time dependent by being elliptically polarized for short periods or over small areas so that the high energy helium can tunnel out of the cavity at preselected times or locations, as the case may be, allowing them to escape through line 41, for example.

Another method is to periodically reduce the circular confining well approximately to 3.4 MeV, so the 3.5 MeV helium ion can escape while giving up most of their energy to the confining field, thereby obtaining direct conversion of nuclear energy to electromagnetic energy.

By multipoint feed of microwave energy to the cavity the configuration of the plasma is controlled particularly as may be necessary during start up operations as well as during a continuous run of the system. The magnetic field within the cavity at each of a plurality of points adjacent to the wall of the cavity is sensed. By this means a plurality of field dependent signals are produced. These signals will vary in magnitude with time as the plasma may change its shape, thus providing a measurement of the magnitude and/or phase of the field at a given sensing location. From the field dependent signals, a plurality of control signals is produced in response to predetermined functions of the field dependent signals. In response to the control signals, the delivery of microwave energy fed to the cavity is controlled on a relatively fast time scale to aid in maintaining a predetermined configuration of the plasma.

As will be explained in connection with FIG. 5, microwave energy may also be controlled in feedback loops on a very fast time scale to provide fine control on the plasma configuration. At a minimum, for the simplest mode of operation the amplitude and/or phase of the energy fed to the cavity would be so controlled as to maintain a substantially true toroidal configuration to the plasma, thus maintaining a fixed space between the plasma boundary and the inner wall of the cavity.

Figure 5:
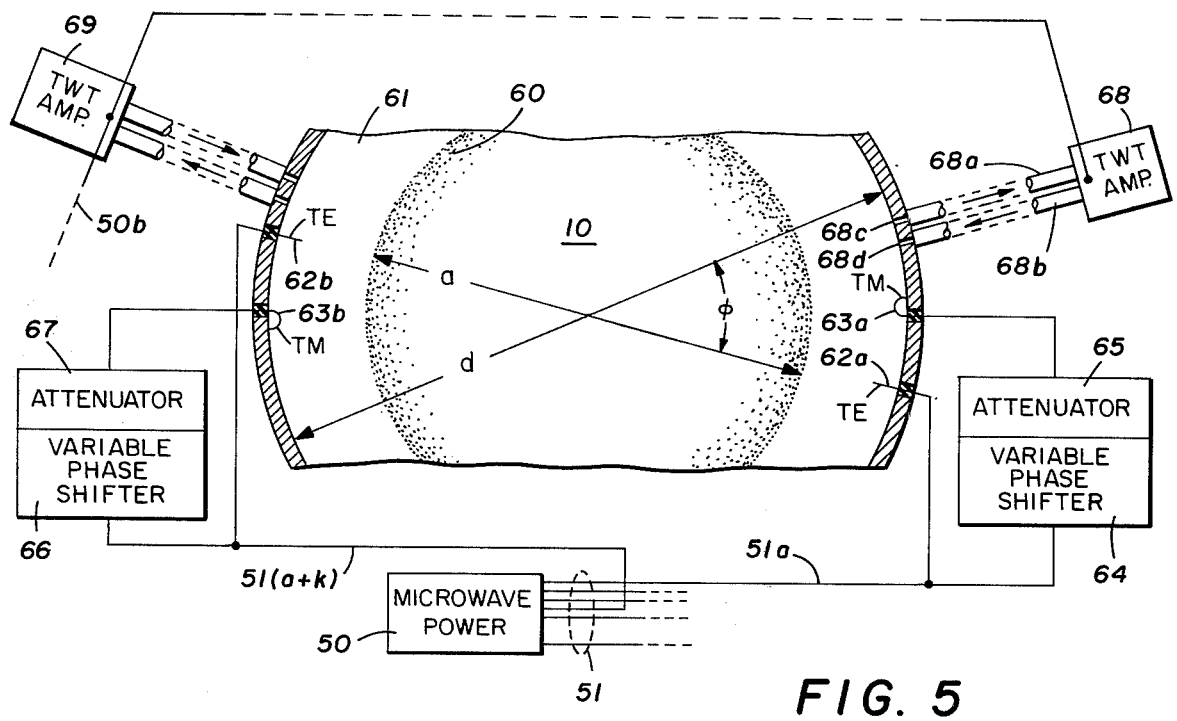
FIG. 5 is a fractional sectional view of the cavity of FIG. 1.

FIG. 5 illustrates a slice out of a section of the cavity 10 of diameter $d$ wherein the plasma 60 of diameter $a$ substantially fills the cavity. An evacuated toroidal shell 61 of radial thickness $(d-a)/2$ exists between the inner wall of the container 10 and the outer boundaries of the plasma 60.

Microwave energy is fed into cavity 10 at a resonant frequency by way of loops 62a and 62b. Standing waves set up in cavity 10 are dependent upon electromagnetic fields. The TM mode is 90° out of phase with the TE mode. As a result, the electric field never goes to zero but is always present to form a barrier within which the plasma is confined.

Excitation of the cavity in the $TE_{010}$ mode is provided by way of a first set of input radiators or loops which provide for an electric field vector in the $x$ direction of the torus, i.e., into or out of the plane of FIG. 5. A second set of input radiators or loops, rotated 90° from the first set, is provided for excitation in the $TM_{010}$ mode. The $TM_{010}$ mode gives rise to an electric field vector in the direction $y$ of the torus. More particularly, the loops will, in a preferred embodiment of the invention, be paired and driven as by way of a common source. As shown in FIG. 5, the loops 62a are driven from microwave source 50 directly by channel 51a whereas the excitation for one of loops 63a passes through a variable phase shifter 64 and an attenuator 65. The phase of the signal is shifted by 90°, Thus causing the field within the cavity 10 to be circularly polarized. The signal applied to loop 63a may be controllably attenuated by unit 65 to introduce a loss to lower the lever of excitation by loop 63a as compared with the level of excitation by loop 62a.

A second pair of loops 62b and 63b are shown in FIG. 2 and are similarly excited. More particularly, loop 62b is separately provided with power from source 50. Likewise, the loop 63b is provided with power from source 50 through phase shifter 66 and attenuator 67. Similarly, all other loops are separately provided with microwave energy to excite the cavity in the combined $TE_{010}$ and $TM_{010}$ modes.

Varying the relative amplitude and/or phase difference of the two modes allows circular polarization of the electric field and further, if desired, allows control over the ellipticity of the polarization. Varying the ellipticity of the polarization has certain advantages which will be described.

The electromagnetic fields plotted in FIG. 4 illustrate the principle of plasma confinement herein employed. More particularly, with the chamber 10, FIG. 5, evacuated and with no deuterium-tritium mixture therein, the electric field may be represented by curve 70. In a cavity 10 with superconductive walls, the electric field ($[E_z + E_\phi]^2$, hereafter $E^2$) at the wall would approach or be zero as illustrated at point 70a. The curve 70 has a maximum 70b, a minimum 70c in the region between the walls, a maximum 70d, and then goes to or near zero at point 70e at the opposite wall. The E field of this configuration, with the container evacuated, is symmetrical in the angle $\phi$, FIG. 5. The magnetic field for such configuration would correspond with the first derivative of the electric field, as is well known.

As the valve 12 of FIG. 1 is opened to introduce a deuterium-tritium mixture to container 10, the deuterium-tritium becomes heated by the microwave energy and forms a plasma centrally of the container 10. When the collective behavior of the plasma dominates the individual particle behavior, the microwave field becomes modified inasmuch as the plasma is highly conductive. The electric field within the plasma will be near zero. The plasma will therefore react upon the electric field. The function $E^2$ is illustrated by the dotted line 74. The line 74 is near zero near the container wall. It rises to a maximum 74a, then abruptly falls to near zero at point 74b. The nonlinear interaction of the electric field thus presents a barrier beyond which the heated electrons may not pass. The associated magnetic field $B^2$ has been illustrated by curve 75 and corresponds with the derivative of $E^2$, curve 74.

The distribution of electrons within the plasma during confinement thereof is illustrated by the curve 77 and represents the electron density. Curve 77 shows that the electron density throughout most of the plasma is substantially constant, with a gradation from the maximum concentration to zero concentration in the region of the peak 75. Thus, the electromagnetic field forms essentially an energy well within which the heated electrons are trapped. The electrons, heated through collisions with the ions, serve to raise the energy level of the ions, heating them to a nuclear fusion temperature. An electrostatic potential forms in the plasma, primarily in the boundary region, as a result of charge separation between the electrons and ions. This potential confines the hot ions.

By employing elliptical polarization the second heating mechanism, that due to time dependent radiation pressure, occurs. This heating effect is present because there are flow mechanisms in the plasma which allow for the degradation of some of the work into heat. Thus, the combination of electric and magnetic polarization to produce circular polarization will assure confinement of the plasma since the electric field will never go to zero, thus there will also be maintained a potential barrier from which the particles in the plasma will recoil. If the field is circularly polarized, there is no time dependent radiation pressure. If the field is elliptically polarized, the extent to which the field deviates from circular polarization can be controlled as by means represented by attenuators 65 and 67 to control the extent of the second heating effect. The difference between the semimajor and semiminor axes of the polarization ellipse represents a time dependent electric field. It is this time dependent portion of the field which is responsible for the time dependent portion of the radiation pressure.

A second way to produce a time dependent radiation pressure and thus to utilize the second mode of heating the plasma would be to eliminate the attenuators 65 and 67 and to adjust the phase shifters 64 and 66 such that, for example, the radiators 62a and 63a would be excited at the same level, but phase difference other than 90°, for example 75°.

Circular polarization introduces a further quality to the system. More particularly, to the extent that the Q of the cavity is determined by phonon coupling in the wall, the use of circular polarization will result in a significant increase in the Q. Further, given a plasma which at time $T_0$ is subject to the imposition of a superconductive boundary, the modes of lowest Q will feed energy into the modes of highest Q and thus the system will naturally flow or progress to the operation state in which there is minimum dissipation. Thus, stable confinement may be the natural end state of the process dictated by the presence of the superconductive boundary. The circular polarization maintained under the Einstein confinement relation assures thermodynamic equilibrium.

If the field is elliptical, as contrasted with purely circular, the plasma will do work on the field and thus will transfer energy to the field which may be extracted by direct conversion as electrical energy.

As the plasma density and volume change during start up of the system, the resonant frequency of cavity 10 as viewed by the microwave source also changes. Initially, with cavity 10 completely evacuated, the resonant frequency will be relatively low. However, as the volume of the plasma grows, there will remain only effectively an evacuated toroidal shell 61, FIG. 5, whose radial dimension $(d-a)/2$ is related to the resonant frequency of cavity 10. Thus, the resonant frequency when the plasma is present will be substantially higher than the resonant frequency before start up. The change in frequency from start up to an operating state may be of the order of 4:1. In accordance with the invention, energy supplied to cavity 10 is changed dynamically to compensate for the tendency for cavity 10 to become detuned and to maintain the electric field at a predetermined level to confine the plasma.

For very fast response plasma control a set of traveling wave tube (TWT) amplifiers are employed. More particularly, as shown in FIG. 5, a TWT amplifier is connected by wave guides 68a and 68b to cavity 10 by way of leak ports 68c and 68d. A small fraction of the energy leaks to the amplifier 68 by way of tube 68a and may be amplified and fed back by way of tube 68b.

Similarly, TWT amplifiers receive energy from cavity 10 and may feed energy to cavity 10. TWT amplifiers such as amplifiers 68 and 69 may be employed in numbers of the same order as the feeds driven from source 50.

A reference signal is applied to amplifiers 68 and 69 and like amplifiers (not shown) in the system. This signal is applied by way of line 50b also shown in FIG. 1. By this means any local variations in shape of the plasma may be sensed and opposed on a very fast time scale by control of energy delivered to the cavity from amplifiers 68, 69 and similar units.

Figure 6:
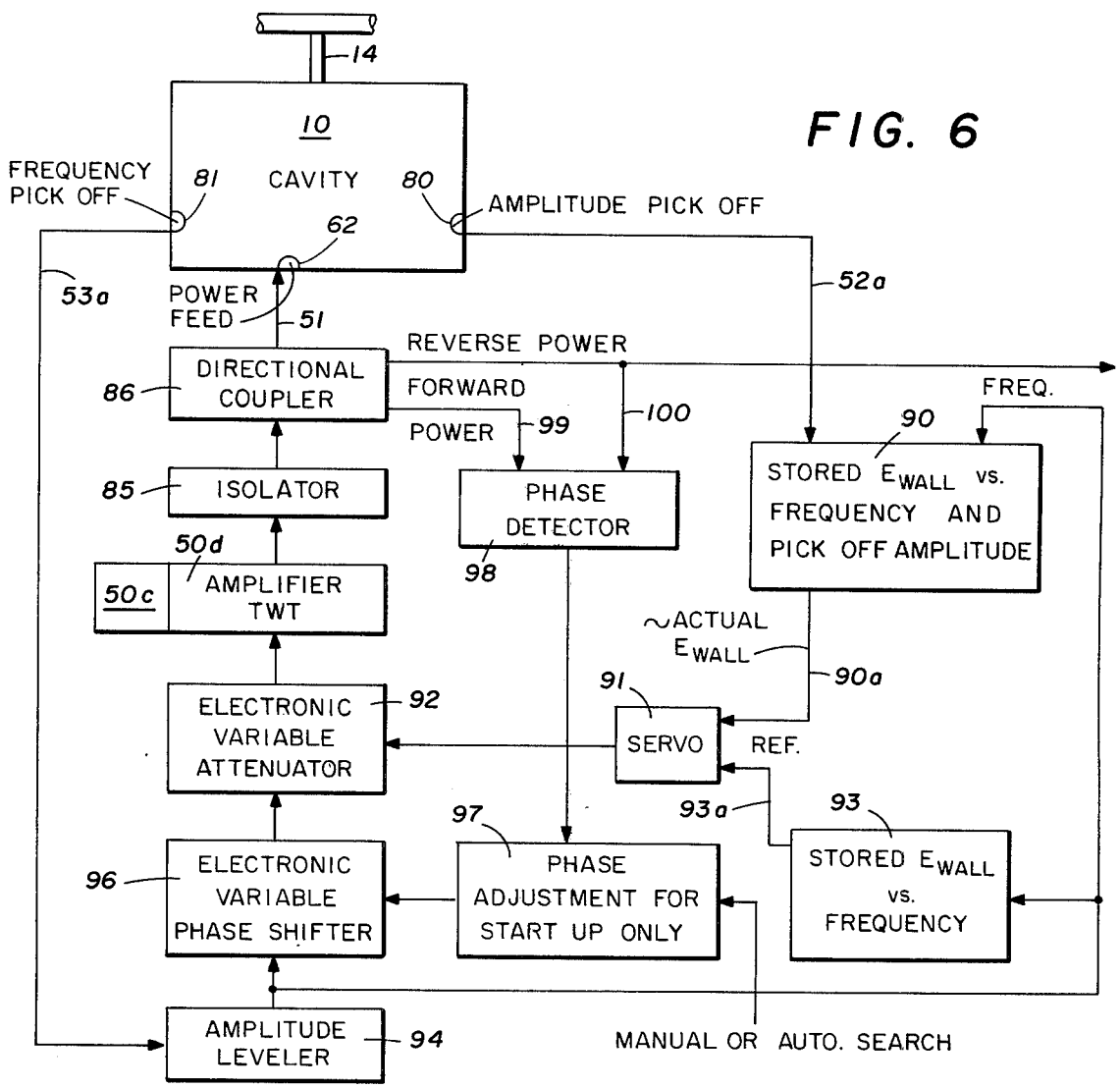
FIG. 6 is a block diagram of the control system for excitation of the cavity shown in FIG. 1.

FIG. 6 illustrates one system for carrying out control of power from source 50. The cavity 10 is shown symbolically with the deuterium-tritium feed line 14 leading thereto, with the microwave feed loop 62 coupled thereto, an amplitude probe 80, and a frequency probe 81. Microwave amplifier 50 is coupled by way of an isolater 85 and a directional coupler 86 to the power feed loop 62. Amplifier 50 may comprise a main high power amplifier and at least one low power amplifier 50c. The amplifier 50 is operated such that the cavity 10 will be excited at resonance in, for example, the $TE_{010}$ mode before flow of gas begins by way of channel 14. It is, of course, to be understood that a second equivalent system, coupled through a phase shifter and/or attenuator to the cavity is necessary to excite the cavity at a resonant condition in, for example, the $TM_{010}$ mode as explained in conjunction with FIG. 5. The amplitude of the electric field and the frequency are sensed by feedback loops to control the amplitude and frequency of the power fed to cavity 10 by way of the feed loop 62. More particularly, the amplitude is controlled by way of a control unit 90 which feeds a servo unit 91 to control a variable electronic attenuator 92. Servo 91 has a reference input signal derived from a second control unit 93 which in turn is responsive to the output of an amplitude leveler 94 whose input is supplied by way of the frequency pickoff 81. Servo 91 thus supplies to the attenuator 92 a control signal dependent upon the difference between the reference signal and the feedback signal from probe 80 to maintain the electric field within the container 10 at a predetermined amplitude. The signal from unit 90 represents the actual electric field near the wall of the container 10. The signal from unit 93 represents the desired electric field. The power output from the amplifier 50 is varied in dependence upon the deviation from the desired electric field as sensed by probe 80.

Pickoff 81 senses the frequency at which the cavity is operating. Pickoffs 80 and 81 may be the same unit but are separately illustrated. It will be appreciated that though energy may be fed into cavity 10 by way of the power feed loop 62 at one frequency because of its own properties, cavity 10 will operate at its resonant frequency in the preferred modes. The frequency pickoff 81 supplies the amplitude leveler 94 with a frequency dependent signal. Variable phase shifter 96 is controlled by the output of unit 94. The phase shifter 96 then feeds the variable electronic attenuator 92 with a signal the frequency of which is the frequency at which the cavity 10 resonates. By this means, the frequency of the signal applied to the amplifier 50 is continuously varied in dependence upon conditions within cavity 10.

A phase adjuster 97 is employed particularly for start up operation to control the variable phase shifter 96 in response to the output of a phase detector 98. The phase detector 98 has two inputs leading from the directional coupler 86. The first input feeds phase detector 98 with a signal representative of the power being fed into cavity 10. This is applied to phase detector 98 by way of channel 99.

A second signal, representative of the power being extracted from the cavity 10 by way of channel 100, is generated. Coupler 86 will accommodate flow of power in either direction. The interaction of charged nuclear reaction products with the electromagnetic field performs work, and also stimulated emission effects. Thus, changes in the electric field may be sensed and field energy extracted as output power by direct energy conversion from the fusion process. Thus, some power is extracted directly from the cavity 10 by way of channel 100.

For control purposes, the phase detector 98 produces an output signal which is proportional to the difference between the phase of the signals on channels 99 and 100. This difference signal then provides for adjustments through units 97 and 96 of the phase of the feedback signal derived by way of the probe 81.

Unit 90 provides an output signal which depends upon the actual amplitude of the electric field in the vicinity of the wall of container 10. This will change as a function of frequency and amplitude of the electromagnetic field is sensed by probe 80. For a given frequency and a given amplitude, the unit 90 will produce an output signal on line 90a which is proportional to the actual amplitude of the electric field. Similarly, a preestablished relationship between the electromagnetic field near the wall and frequency is stored in unit 93. In response to a change in frequency, a prestored reference value of the electric field thus appears on the reference output line 93a.

The microwave feedback system maintains the desired boundary conditions for two operational phases: (1) during plasma buildup, and (2) steady state operation during burn.

In phase 1, variations in required plasma power and cavity operating frequency will occur. This requires effectively switching from a wide bandwidth and low power amplifier 50c at low plasma densities to a high power narrower bandwidth amplifier 50d at the final plasma density. In phase 2, a high power loop is operated to maintain the final desired electric field amplitude in the toroidal mode in spite of small scale fluctuations in operating frequency or plasma oscillations, while the average plasma density remains constant.

During plasma buildup the running frequency will increase by a factor of about 3 or 4. The power requirements will increase by a factor of about 2 since the wall losses are of the same order of magnitude as the plasma power. In view of plasma buildup to equilibrium, amplitudes of the E field vs. plasma density function are preestablished for the range from zero to final density as are frequencies. Computations for the above desired relationships result from physical relationships of the interaction of the electromagnetic field with the plasma. This involves both self consistent field equations and energy exchange, based upon, for example, the Einstein confinement relation set forth above. Resonant frequency shifts are accompanied by changes in amplitude in the E field 74, FIG. 4. Thus, the servo 91 preferably responds to a preselected reference program so that the electric field is maintained within the desired range at each frequency.

Directional coupler 86 allows for electromagnetic energy to flow either into or out of cavity 10 and the charged reaction products, such as alpha particles and protons, perform work on the microwave field. One way to maintain the electric field amplitude at the desired level is to extract microwave power.

The extraction of electromagnetic power from the microwave field is made possible by reason of stimulated emission due to the reaction of alpha particles produced in the course of the release of nuclear energy in burning of the fuel inputs. More particularly, alpha particles of high energy, on the order of 3.5 MeV, react with the confining field in the region of a high concentration of photons. In giving up energy when changing direction by reaction of the confinement field, the rate at which the alpha particles radiate photons is stimulated, thus transferring energy from the alpha particles to the electromagnetic field. It is this input of energy to the magnetic field as the energy of the alpha particles is dissipated that represents a direct conversion from nuclear to electromagnetic energy. The process is somewhat related to the stimulated emission encountered in the operation of maser systems where the alpha particles represent the population inversion necessary in order to transfer energy from the high energy component of the population inversion into the radiation field by stimulated emission. The difference between the mechanism employed herein and that employed in a maser is that the population inversion in the present case visits the radiation field whereas in the case of the maser, the radiation field visits the population inversion. Also, the present case deals essentially with transitions between free rather than bound states.

Figure 7:
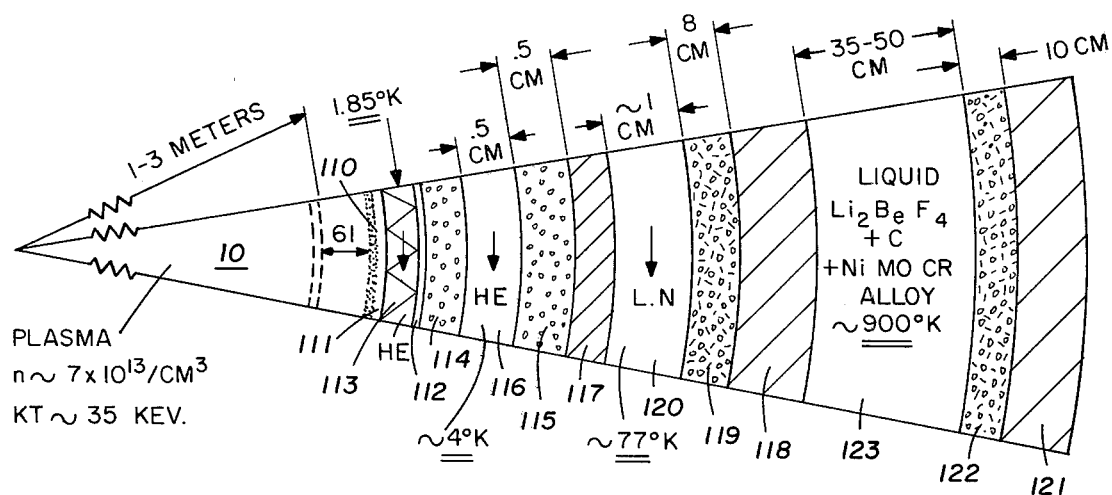
FIG. 7 is a pie section illustrating the construction of the reactor wall.

Referring now to FIG. 7, a pie section showing the walls of the cavity 10 has been illustrated. In a preferred embodiment of the invention, the inner wall of the container 10 comprises a niobium film 110 of the order of 0.001 centimeter thick. The radius of the torus D is between 1 to 3 meters. Immediately outside of the liner 110 is a honeycomb supporting structure 113 of beryllium, lithium-magnesium alloy or the like, low Z elements wherein inner and outer layers 111 and 112 of foil of about 0.0012 centimeter are maintained separated by the perforated honeycomb structure 113 of the order of 0.16 centimeter in thickness. Provision is made for introducing and circulating liquid helium at about 1.85° Kelvin through the perforated honeycomb 113 to maintain the temperature of the niobium liner 110 at about 1.85° Kelvin, thereby to render the liner 110 superconducting. By this means, the losses in the cavity wall are maintained at a minimum. This renders the operation feasible without having to supply energy to cool the walls and dissipate the energy loss therein in excess of the energy produced in the reactor.

Outside the layer 112 is a layer 114 of insulating foam, such as polyethylene or the like. This layer preferably will be of the order of 0.5 centimeter in thickness having a density of from 0.05 to 0.1 gram per $cc^3$. A second layer 115 encompasses layer 114 with a flow zone 116 therebetween. A wall 117, of molybdenum or like material of the order of 0.2 centimeter thick, then serves to support the elements therein. Suitable spacers in the form of honeycomb columns or rods extend between the inner surface of the layer 117 and the outer surface of the layer 112 to maintain the space 116 therein. Means are provided for introducing and circulating liquid helium through the space 116 at a temperature of about 4° Kelvin.

Outside the shell 117 is a second shell 118 approximately one centimeter thick made of molybdenum or like material. Inside the shell 118 is an insulating liner 119 of polyethylene foam or the like, which is spaced from the outer surface of the shell 117 to provide a space through which liquid nitrogen is continuously circulated. The spacing for the zone 120 is approximately one centimeter. Suitable spacers such as honeycomb columns or the like extend between the outer surface of the shell 117 and the inner surface of the shell 118.

An outer shell 121 of lead or other material forming a biological shield is spaced form the shell 118 and has on the inner surface thereof a high temperature thermal insulator layer 122. The spacing between layer 122 and the outer surface of the shell 118 is made substantial, from 35–50 centimeters. Fused salts which act as a primary neutron absorber circulate through the zone 123 for absorbing neutrons produced in the plasma. The fused salts are heated by reaction products and provide a heat transfer medium to extract fusion energy from the reactor system. Also, tritium may be produced in the salts so that the system generates its own tritium requirements. In one form, the fluid circulated in the zone 123 may be maintained at about 900° Kelvin and formed of $Li_2BeF_4 + C + NiMoCr$ alloy. The outer lead shield 121 may be of the order of 10 centimeters thick.

The liquid helium circulating through the zones 113 and 116 preferably will be maintained at several atmospheres pressure thereby to provide a pressurized system for support of the wall layer 110, thereby aiding it to withstand the operating pressures developed by pressure within the container 10 due to radiation. The nitrogen circulated in the zone 120 is at a pressure of approximately 1.5 atmospheres.

In this system, the plasma within the container 10 will occupy most of the volume, leaving the evacuated layer 61 between the boundary of the plasma and the liner 110. The plasma preferably will have a density of approximately $1 \times 10^{13}$ atoms/cm$^3$. Microwave energy will be supplied the container 10 to heat the plasma to approximately 35 kev.

Figure 8:
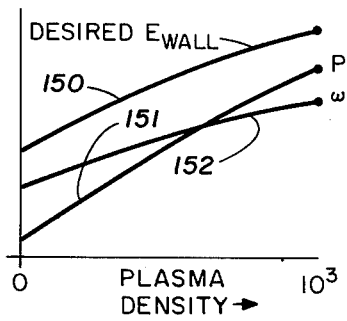
FIG. 8 is a graph illustrating variations in power and operating frequency and in the E field for confinement and operation of a plasma.

FIG. 8 illustrates in curve 150 variations in the desired electric field near the wall; in curve 151 the power required for operation; and in curve 152 variations in the operating frequency as a function of plasma density as it changes from zero to $10^{13}$ atoms/cc. From curve 151, the power required to confine and heat the plasma increases as a function of density. From curve 150 the desired electric field ($E_{wall}$) also increases. From curve 152, the operating frequency ($\Omega$) also increases as the plasma density increases. From the confinement relation, for a given plasma radius, R, the thermodynamic equilibrium may be expressed:

$$R = \left(\frac{5}{2\pi^2}\right) \lambda^2 \frac{\omega_p}{c} \qquad (12)$$

As the plasma density increases $$\omega_p = \left(\frac{n_e}{4\pi e^2 m_e}\right)^{1/2}$$

increases, and therefore $\lambda$ must decrease, i.e., the running frequency increases.

Figure 9:
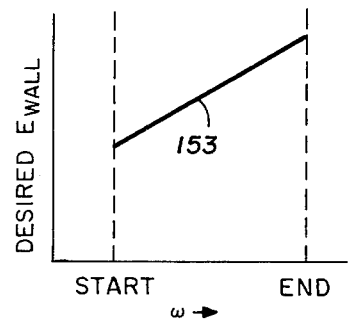
FIG. 9 illustrates the relationship between the desired electric field at the wall and the operating frequency of the cavity.

FIG. 9 illustrates in curve 153 the relationship between the operating frequency and the desired electric field. As the frequency increases at the end point or at the stable operating condition, the desired electric field magnitude increases.

Figure 10:
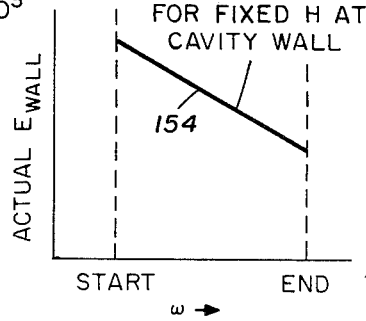
FIG. 10 illustrates the variation of the electric field near the wall as a function of frequency for the condition when the magnetic field at the wall is constant.

FIG. 10 illustrates in curve 154 the variation in the actual electric field ($E_{wall}$) plotted as a function of operating frequency ($\Omega$) for the condition where a fixed magnetic field is maintained at the cavity wall.

This graph clearly indicates that a constant H field is not the proper criteria for operation control. The information required for desired operation is the value of the magnetic field at the wall of container 10, the power required, the operating frequency at which the stored peak E and H field energies are equal and the energy stored in the electromagnetic field.

Figure 11:
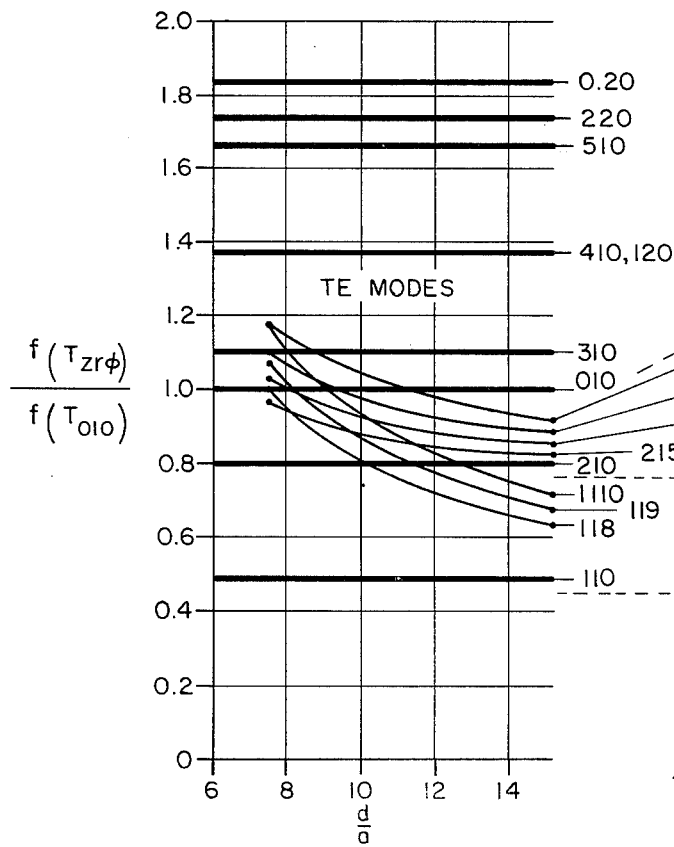
FIG. 11 is a graph of the ratio of the frequency of various modes in the cavity to the frequency of the $TE_{010}$ mode as a function of the ratio of diameter of the cavity to the spacing between the plasma boundary and the cavity wall.

The distance between the cavity wall and the outer boundary of the plasma may change. In FIG. 11 there is plotted the ratio of the frequency of TE modes other than $TE_{010}$ to the frequency of the $TE_{010}$ mode. The values of this ratio are plotted as a function of the ratio of the tube diameter $d$ to the spacing $a$ between the boundary of the plasma and the inner wall. Cavity 10 will have modes along the length ($z$), along the radius ($r$), and in the dimension of the angle $\phi$, FIG. 2. As above indicated, the desired or preferred transverse electric mode is the $TE_{010}$ mode.

FIG. 11 shows that the $TE_{218}$, $TE_{217}$, $TE_{216}$, $TE_{215}$, $TE_{1110}$, $TE_{119}$ and $TE_{118}$ modes are modes into which the operation in the cavity may tend to shift. That is, as the curves for the modes above enumerated intersect the ordinate 1.0, there is a tendency for the cavity 10 to operate in a mode other than $TE_{010}$. In accordance with an aspect of the invention, a plurality of feeds drive the cavity at spaced points along the cavity wall. The feed points are spaced both in the $z$ and $\phi$ dimensions to eliminate resonance in undesired modes and to force resonance in the $TE_{010}$ mode. More particularly, for the TE modes 210, 215, 216, 217 and 218, feeds suitably spaced 90° apart in the $\phi$ dimension will eliminate them. For the TE modes 118, 119 and 110, feeds spaced 180° in dimension $\phi$ will eliminate operation in the latter modes.

Figure 12:
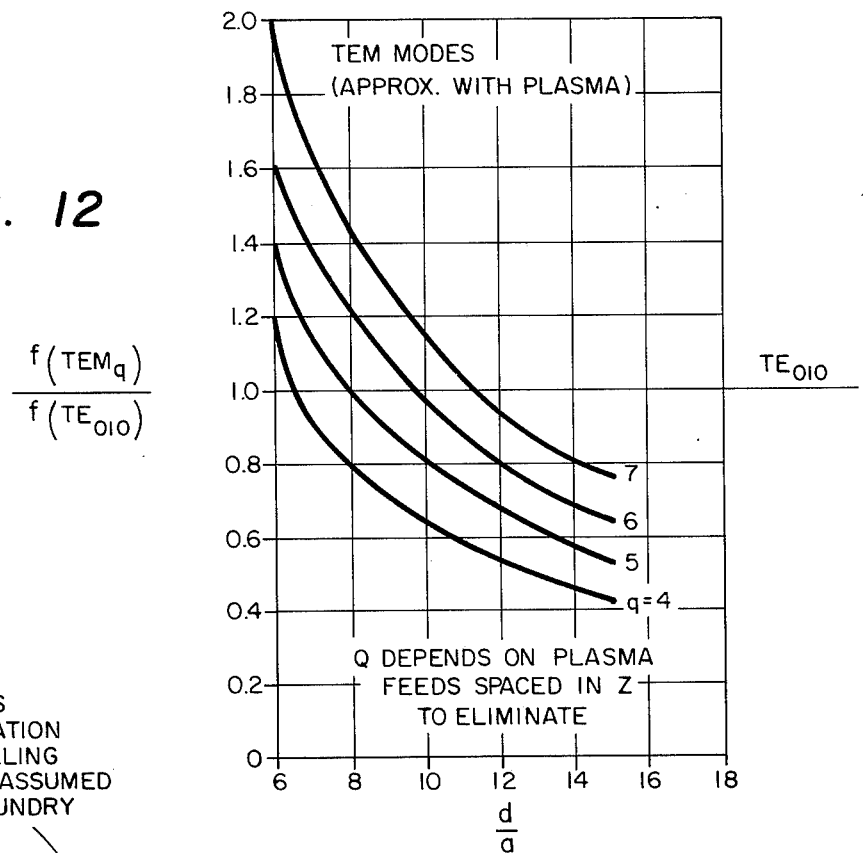
FIG. 12 is a similar graph showing the relationship between TEM modes and the $TE_{010}$ modes.

In FIG. 12, variation in the frequency of the $TEM_q$ mode to the frequency of the $TE_{010}$ mode have been plotted. Here it will be noted that the modes 4, 5, 6, and 7 all cross the ordinate 1.0 and thus there would be a tendency for the cavity to operate in the TEM modes depending upon the plasma dimensions. Feeds spaced in the $z$ or length dimension of the cavity may be so oriented as to eliminate the tendency to operate in the TEM modes.

Figure 13:
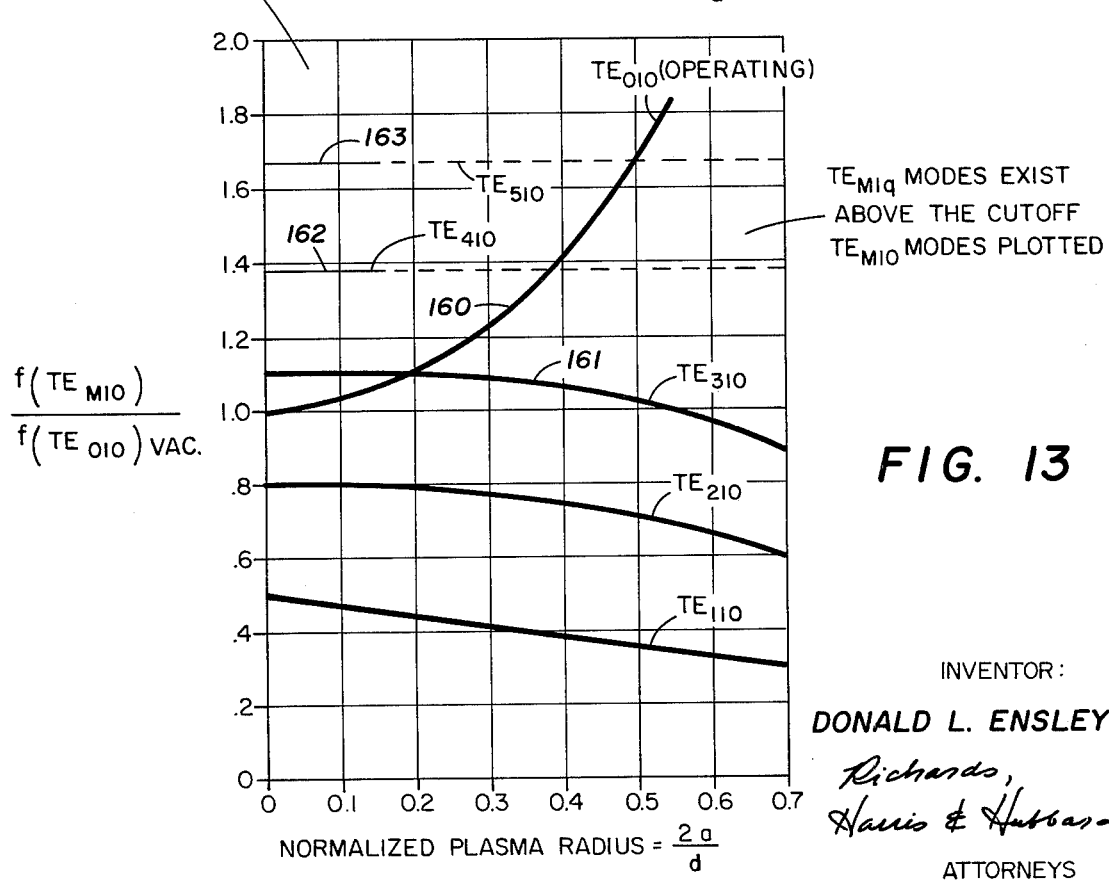
FIG. 13 is a similar graph illustrating the relation between the $TE_{M10}$ mode and the $TE_{010}$ mode.

In FIG. 13, variation in the ratio of the frequency $TE_{M10}$ modes to the frequency of the $TE_{010}$ mode are plotted for variation in the size of the plasma. These curves are plotted assuming the plasma boundary is as conductive as a metallic wall. It will be noted that the ratio varies from the vacuum condition to the operating or filled condition. Thus, the preferred curve 160 representing the preferred mode of operation intersects curves 161, 162 and 163 for other TE modes. There are many $TE_{M10}$ modes above the cutoff $TE_{M10}$ mode. To eliminate the possibility of operating in TM modes, at least 2M feeds will be spaced in the $\phi$ dimension.

The plasma is a dynamic body. The adiabatic streaming motion of the plasma occurs on a hydrodynamic time scale generally of the order of the speed of sound in the gas as the upper limit. This is the maximum speed at which the plasma will change. The microwave period in general is several orders of magnitude smaller than the hydrodynamic time scale or period. This means that it is possible to maintain the electric field as to have a desired configuration. This is because the configuration of the electric field can be changed much more rapidly than the speed at which the configuration of the plasma can change significantly.

The greatest probability of variations in the configuration of the plasma occur in the radial direction and in dependence upon the circumferential parameter $\phi$. A system with feeds placed around the torus in the $\phi$ parameter at points spaced apart by a wavelength with such arrays also spaced in the $z$ dimension at spacings of the order of a meter, represents about the maximum number of feeds that would be necessary for the system to respond in a dynamic sense to changes in the configuration of the plasma. Far fewer feeds may be adequate depending upon the cavity employed and the operating parameters chosen.

As previously mentioned, excitation of the electrons in the plasma by the microwave field takes place and at the same time, the electric field forms a well in which the electrons are contained. The ions are contained because of charge separation, however, in the region of the boundary of the plasma.

FIG. 14 illustrates charge separation produced in the boundary of the plasma. Curves 165 and 166 obtain for the conditions that the electrostatic field equals $1.6 \times 10^3$ esu, the ratio $$\left(\frac{\omega_c}{\omega}\right)^2 = 100,$$

$kT = 10$ kev and $n_0 = 5 \times 10^{12}$. Under such conditions, the concentration $n$ as a function of radial distance has been plotted. In curve 166 the number of ions in the boundary of the plasma falls off rapidly, well ahead of the fall off in the number of electrons, curve 165. Thus, the difference between the two curves $n_i$ and $n_e$ of FIG. 14 graphically portrays the existence of charge separation. It is by reason of this charge separation that the ions, even though of much greater mass than electrons, are contained within the plasma. The concentration of electrons is greater closer to the wall than the concentration of ions for the conditions above described under which curves 165 and 166 were obtained.

Different conditions will result in different shapes to the curves involving charge separation. It is the fact of separation, however, that is important to the present considerations and thus the single set of curves is shown to illustrate conditions which exist in the plasma boundary. The curves in FIG. 14 were obtained by solving the self consistent field equations (13) and (14) below. Simultaneous solution of these two equations is plotted in FIG. 14.

$$\nabla \times \nabla \times \vec{E} = \frac{\omega^2}{c^2} \left( 1 - \frac{\omega_i^2}{\omega^2} \exp\left( \frac{-E^2 e^2}{kT 4 m_i \omega^2} - \frac{e\phi}{kT} \right) \right.$$

$$\left. - \frac{\omega_e^2}{\omega^2} \exp\left( \frac{-E^2 e^2}{kT 4 m_e \omega^2} + \frac{e\phi}{kT} \right) \right) E \quad (13)$$

$$-\nabla^2 \phi = n_o 4\pi e \left[ \exp\left( \frac{-E^2 e^2}{kT 4 m_e \omega^2} + \frac{e\phi}{kT} \right) \right.$$

$$\left. - \exp\left( \frac{-E^2 e^2}{kT 4 m_i \omega^2} - \frac{e\phi}{kT} \right) \right] \quad (14)$$

where:
$\vec{E}$ is the electric field vector;
$\Omega$ is the circular frequency of the microwave field;
$c$ is the velocity of light;
$\Omega_i$ is the ion plasma frequency;
$m_i$ is the mass of the ion;
$\Omega_e$ is the electron plasma frequency;
$m_e$ is mass of the electron;
$e$ is the charge of the electron;
$\phi$ is the self consistent potential field;
$k$ is Boltzman's constant;
T is temperature;
$n_o$ is particle density of electrons; and
exp is the base of the natural logarithm.

Relativistic corrections to the self consistent field, equation (13), are as follows where equation (13) is rewritten as:

$$\nabla \times \nabla \times E = (\Omega/c)^2 \epsilon \, E \quad (15)$$

The relativistically correct dielectric coefficient $\epsilon$ is:

$$\epsilon = 1 - (H4)(vL)(EX) \quad (16)$$

where:
$\omega$ = circular frequency of field;
$n_o$ = maximum particle density in the plasma core;

$$H4 = \frac{4\pi e^2}{M} \frac{n_o}{\omega^2} = 3.1828 \frac{n_o}{\omega^2} \times 10^9;$$

$$vL = \left[ \frac{ALF}{1 + ALF} \right]^{1/2};$$

$$ALF = 3.2347 \times 10^{-15} \frac{\omega^2}{E^2};$$

$$EX = e^{HS(1 - PL)};$$

$$H5 = \frac{m_e c^2}{4kT} = 2.047 \times 10^{-7}/kT; \text{ and}$$

$$PL = \frac{1 + ALF}{ALF}^{1/2}.$$

Equations (13) and (14) are derived from the self consistent field equations (15) and (16) noted by Watson et al at page 196, *Electron Physics*, Vol. 23, 1967.

Equation (13) is an expression, assuming a Maxwellian distribution of the plasma particles. Equation (14), for the same assumption, is Poisson's Equation, describing the electrostatic potential in the plasma.

The graph of FIG. 14 and the fact that such charge separation exists within the plasma as there illustrated, satisfies the query as to whether or not the collective equilibria are confined by the microwave field.

The probability of escape of individual particles from the field which may scatter and tend to escape from the well is of interest. It can be shown, for individual particle motion within the collective well, taking into consideration relativistic effects thereon, that the individual particle leakage flux is less than that corresponding with the high energy tail of the Maxwellian distribution. More particularly, electrons and ions within the plasma have a distribution of velocities. There will be few if any particles at zero velocity. There will be a peak in the plot of the number of particles at a particular velocity within the plasma. There will be a few particles that have extremely high velocities. This distribution is called a Maxwellian distribution. According to such distribution, some particles within the plasma will exhibit energies exceeding the field and thus will escape.

Assuming that the particle distribution is Maxwellian to energies above the confining well, it can be shown that the particle flux which would exceed the energy of the well is larger than the actual scattering of particles over the well with the actual distribution encountered in the plasma. The rate based upon the Maxwellian tail is itself small enough that the time required for significant leakage of the plasma is large compared to the time required for the desired extraction of nuclear energy.

Equation (17) below will provide an understanding of the escape probability due to the time dependence on the magnitude of the well. It will be appreciated that in an operation where the container is excited in the $TE_{010}$ mode, the electric field periodically will reverse and will of necessity pass through zero, if plane polarized. In such case, equation (17) may be employed, though complex, to evaluate the probability of escape:

$$P_z + \frac{c}{\left[ 2(m_o c)^2 + P_r^2 + \frac{e^2 E(r)^2}{\omega^2} \cos^2 \omega t \right]^{1/2}} \frac{e^2}{\omega^2} \cos^2 \omega t \frac{\partial}{\partial z} E(z)^2 = 0 \quad (17)$$

where $z$ is the direction in which the confining well is effective;

$E$ is the field described by the solution to equations (13) and (14), and $m_o$ = rest mass of the electron.

Equation (18) below sets forth the heating rate for the plasma, due consideration being given to the relativistic effects by reason of high electron velocities within the plasma. The solution to equation (18) is important in order to equilibrate the heating of the plasma with the energy loss due to the bremsstrahlung and to assess the power requirements for the microwave system to achieve a given temperature in the plasma.

$$\left\langle \overset{\circ}{W} \right\rangle = 1.568 \times 10^{-33} \cdot n_o \frac{\omega}{E} e^{\left[\frac{+6.3297 \times 10^7 E}{\omega^2 kT}(vL)\right]} Ex \mid \quad (18)$$

where:

$$Ex \mid = \int_0^s \frac{s}{c} \cdot \sqrt{x} \, dx, s = \frac{1.2659 \times 10^8 E^2(vL)}{\omega^2 kT};$$

$$vL = \frac{ALF}{1.0 + ALF}^{1/2}, \text{ and}$$

$$ALF = 3.2347 \times 10^{-15} \frac{\omega^2}{E^2}.$$

REACTOR ENERGETICS

The following will briefly treat the reactor energetics of the present invention to demonstrate a net energy gain. There are several different power considerations:

$P_0$ = initial power (equivalent);
$E_0$ = initial energy;
$P_B$ = power to absorb bremsstrahlung energy;
$P_e$ = loss in cavity walls;
$P_p$ = power used in the plasma;
$P_n$ = energy per fusion.

For the purpose of the example, it will be assumed that the reactor operates at 35 kev.

Initial Power – $P_O$

It can be shown that the initial energy $E_o$ may be expressed as follows:

$$E_o = 3nkT \quad (19)$$

where $n$ is the particle density (ions or electrons) per cubic centimeter, $k$ is the Boltzman constant, and $T$ is temperature.

The initial power $P_O$ may be expressed as follows:

$$P_0 = \frac{3nkT}{t_B} \quad (20)$$

where $t_B$ equals burn time, that is the time during which energy is produced at a steady rate.

For the assumed case where $kT = 35$ kev and where $n_i$ equals $1 \times 10^{14}$, it will be seen that the initial power is:

$$P_O = 1.72/t_B \text{ watts/cm}^3. \quad (21)$$

Bremsstrahlung – $P_B$

The loss $P_B$ radiation from the plasma which will be spread in energy between 5 and 35 kev, may be expressed as follows:

$$P_B = 5.35 \times 10^{-31} n^2 (kT)^{1/2}, \text{ or} \quad (22)$$

$$P_B = .0317 \text{ w/cm}^3. \quad (23)$$

Equation (22) defines the rate of power in watts per cubic centimeter. Equation (23) indicates that 0.0317 watts/cm$^3$ is to be removed from the reactor system, assuming the most pessimistic case that all of it is removed at the low temperature of the inner cavity wall.

Wall Skin Effect Losses – $P_e$

Because all energy losses in the wall must be pumped away at the wall temperature, this operation is the least efficient from the refrigeration standpoint, and therefore of primary importance in the energy balance.

Using the classical expression from Watson et al (supra) for losses in a metallic conductor and operating at a temperature of about 2° K for a cavity wall of niobium thus at a cavity $Q = 1 \times 10^{11}$ and a wavelength $\lambda = 30$ cm, it can be shown that the refrigeration power $P_{Rw}$ for maintaining the temperature of the wall and assuming a refrigeration efficiency approaching 30% of a carnot cycle is:

$$P_e = 0.138 \text{ watts/cm}^3. \quad (24)$$

The power required to remove heat due to wall losses is small compared with power generated $P_n$.

Plasma Heating – $P_p$

It can be shown that the power to heat the plasma is $$P_p = 0.011 \text{ watts/cm}^3.$$

Plasma may be heated efficiently by electron-ion collisions in the fields employed in cavity 10 because the average escape time is large compared to the time required to transfer energy to an ion.

Nuclear Fusion Energy – $P_n$ $$P_n = \frac{1}{4} n^2 Q_E \langle \sigma v \rangle \, 1.6 \times 10^{-16} \text{ watts/cm}^3 \quad (25)$$

where $\sigma$ is the fusion cross section, $v$ is the relative velocity of particles, and $\langle \sigma v \rangle$ is the average reaction rate assuming Maxwellian particle distribution for a temperature T.

The amount of kinetic energy released upon fusion of two nuclei is (assuming neutron capture energy release of approximately 5 MeV):

$$Q_E = 22.4 \text{ MeV/reaction and the ratio of } (P_B/P_n)_{min}$$
$$= 0.0056 \text{ at } kT = 35 \text{ kev}. \quad (26)$$

Hence, $P_n = P_B/.0056.$ (27)

If all the bremsstrahlung were absorbed in a 2° K niobium cavity wall 110, FIG. 7, then, for a refrigeration efficiency within 30% of carnot, $$P_{HH} = (150)(1.3)(0.0056)P_n \qquad (28)$$

or $P_{RB}/P_n = 1.09$. This means that based upon the foregoing, there would be negative net power but based upon the foregoing assumptions, the unit would just about break even as between input power and power produced. Fortunately, two provisions in the system assure a net power gain. First, unlike the microwave wall losses, there is no need to absorb the 35 kev photons in wall 110 near 2° K. The mean free path for 35 kev photons is about 1/7 gm/cm². A relatively thin coat 110 of niobium ≤ 0.001 cm is employed to line cavity 10. Photons then pass through the inner layer 110 and expend energy in a second shell 116 composed of a structural but thin layer of circulating liquid He⁴ at ≃ 4° K, with the thermal gradient taken up across insulating layer 114. Most of the photon energy is thus pumped away at an equilibrium temperature of about 4° to 5° K. This means that the cost of cooling/cc against bremsstrahlung is about 0.44 $P_n$. The sum of all energy loss mechanisms, as above noted, including refrigeration power to overcome bremsstrahlung heating and microwave skin effect heating of the cavity wall as well as the plasma power requirements and initial or start up power, is substantially less than $P_n$.

Figure 15:
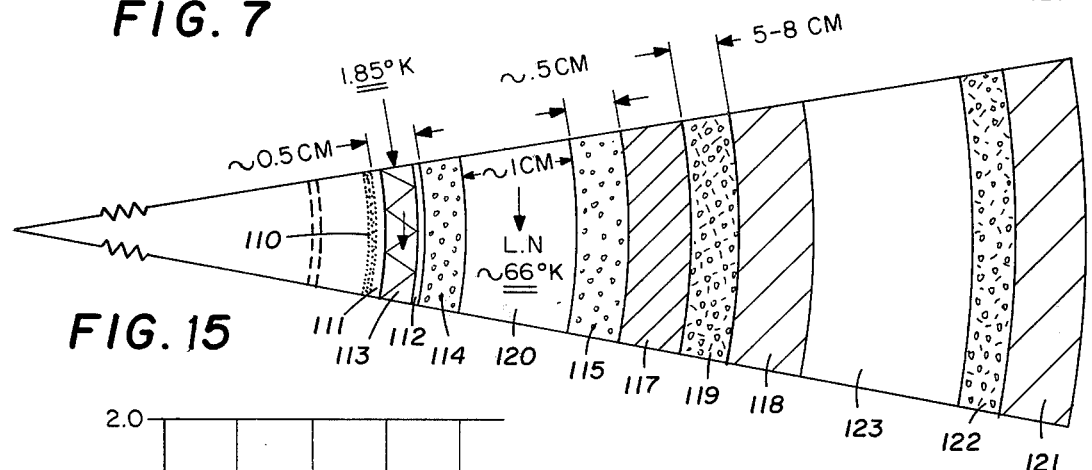
FIG. 15 is a pie section of the modified form of the cavity.

In FIG. 15, a modified form is illustrated in which only one liquid helium coolant blanket is employed and in which liquid nitrogen is employed at about 66° K as a second coolant blanket. FIG. 15 corresponds generally with FIG. 7 wherein like parts have been given the same reference character. In this system, the liquid nitrogen blanket is employed at a lower temperature so that the bremsstrahlung heating can be removed at this level.

The foregoing description has dealt principally with operations in the combined $TM_{010}$ and $TE_{010}$ modes, or the combined $TM_{020}$ and $TE_{020}$ modes. Operation in combined TE and TM modes assures confinement of the plasma by reason of the fact that, in a combined mode, the electric field never goes to zero.

The foregoing description has further been directed to operations in which continuous flow of a gas mixture is supplied the cavity and a continuous evacuation operation maintained so that the burn is maintained at about 50%.

In accordance with an alternate mode of operation, the following sequence will be followed after initial evacuation of the chamber:

a. The microwave field will be applied to the cavity to establish the standing wave field; (b) a gas mixture is then introduced; (c) the frequency and amplitude of the standing waves are then monitored and the microwave feed is altered in order to form and contain the plasma; (d) the plasma then burns to a 25% to 50% burn; (e) the microwave field is then removed; (f) the cavity is then opened to a vacuum source and the spent products are evacuated; (g) the cycle is then repeated. The burn interval may be of the order of 15 to 20 seconds with an interval of 1 second required for evacuation and filling between burns.

In the pulse mode described in the preceding paragraph, it is undesirable for any of the plasma to impinge upon the walls of the microwave cavity. Therefore, the plasma may be channeled from the cavity by utilizing a magnetic field which is activated at the same time the microwave field is removed. Such a magnetic field would be such that the lines of force would pass out through the cavity walls at ports provided in the cavity walls. Such ports would withstand contact with the hot plasma. Since it is difficult for charged particles to cross magnetic flux lines, the charged particles making up the hot plasma would follow or spiral along the flux lines and exit at the special ports.

Thus, in the pulse mode, circular coils will be provided around the microwave cavity to produce magnetic flux lines extending parallel to the axis of the cavity, i.e., along the Z direction of the torus. If the coils are of limited width and are appropriately spaced, the flux lines of each coil will pass out of the torus at the ends of the coil. The exhaust ports will be located between adjacent coils.

Further, elements other than deuterium and tritium may be employed to alter the propensity of the plasma for neutron production. Reduction in the neutrons flux produced and an increase in the amount of energy in the plasma working against the electromagnetic field will result in an increased production of energy by way of direct conversion. Suitable ingredients for introduction into the reactor to minimize the neutron flux include deuterium and He³ to produce high energy protons as well as alpha particles.

Further in accordance with the invention, the description has related to the inclusion of spaced radiating elements in the wall of the cavity to establish and maintain the microwave field for containing and heating the plasma. The radiating elements may form or approximate a continuous boundary, termed a live boundary, which is the ultimate in a reactive wall system. However, a probable limit to which necessary radiators are supplied for all purposes has been noted. Minimizing the number of radiators depends upon the size of the chamber, the mode of excitation and the character of the feedback system.

The cavity walls may be of a solid maser material which when pumped with energy in electromagnetic waves would permit operation at a more favorable mode dependent solely upon the characteristics of the electromagnetic field produced by the maser thus to use in an ultimate sense a live boundary for the cavity.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of confining and heating an ionized plasma which comprises:
    a. applying electromagnetic energy to establish a circularly polarized standing electromagnetic wave in at least a basic mode in a superconductive walled container containing a plasma at a density of about $10^{13}$ to $10^{14}$ atoms per cubic centimeter with the E field of said wave substantially parallel to said wall, near zero at said wall, and passing through a minimum in the region enclosed by said wall, and
    b. varying the frequency and amplitude of said electromagnetic wave in response to collective motion of the plasma to nullify the effect of said collective motion upon said field.

2. The method of claim 1 further comprising:
evacuating the area between the walls of said container and the plasma.

3. The method of claim 1 wherein said mode is established by feeding microwave energy to said cavity in preselected TE and TM modes.

4. The method of claim 3 wherein the energy of one of said modes is higher than the energy of the other of said modes.

5. The method of claim 1 wherein said frequency and amplitude of the electromagnetic wave is automatically varied in response to motion of the plasma.

6. The method of claim 1 wherein said standing electromagnetic wave is a combination of the $TE_{010}$ and $TM_{020}$ modes before some plasma is formed and thereafter a combination of the $TE_{010}$ and $TM_{010}$ modes.

7. The method of claim 6 wherein the amplitudes of said $TE_{010}$ and $TM_{010}$ modes are the same.

8. The method of claim 6 wherein the amplitudes of said $TE_{010}$ and $TM_{010}$ modes are different.

9. The method of claim 1 wherein a component of said gas comprises deuterium.

10. The method of claim 1 wherein said gas comprises deuterium and tritium.

11. The method of claim 1 wherein said chamber has the configuration of a torous with said E field substantially parallel to the walls of said torous.

12. A method for producing a condition for sustained nuclear fusion in a microwave cavity comprising:
   establishing a circularly polarized standing electromagnetic wave in said cavity by combined TE and TM modes with an E field which is parallel to the wall of said cavity and passes through a minimum intermediate the walls of said container and is substantially zero at the walls of said cavity thereby creating an energy well,
   introducing a gas comprising elements capable of fusion into the container to confine said gas in said energy well at a density of about $10^{13}$ to $10^{14}$ ions per cubic centimeter while evacuating the region surrounding the energy well, said region formed between the walls of said container and the boundary of said confined gas,
   varying the frequency and amplitude of said electromagnetic wave to maintain a resonant condition such that the E field passes through a minimum substantially near the boundary of the gas confined in the energy well as the gas is added to the container, and
   maintaining said gas in said well to ionize the gas and to raise the temperature of ions by coulomb interaction to a nuclear fusion level.

13. The method of confining and heating an ionized plasma in a toroidal chamber which comprises:
   a. applying electromagnetic energy at a plurality of points spaced in two dimensions along the walls of said container to establish a circularly polarized standing electromagnetic wave in said container filled with a gas to a density of from about $10^{13}$ to $10^{14}$ atoms per cubic centimeter, the E field of said wave substantially parallel to said wall and passing through a minimum in the region enclosed by said wall, said plasma being substantially confined in said region, and
   b. automatically varying the frequency and amplitude of said electromagnetic wave in response to collective motion of the plasma to nullify the effect of collective motion upon said field.

14. The method of claim 13 wherein a refrigerant is circulated contiguous to said walls of said container to maintain said wall superconductive.

15. The method of claim 13 wherein the frequency and amplitude of the electromagnetic wave are automatically varied by:
   sensing the electromagnetic field at each of a plurality of points adjacent said wall of said container to produce a plurality of field dependent signals,
   generating a plurality of control signals in response to predetermined functions of said field dependent signals,
   in response to said control signals modifying said electromagnetic energy applied to said cavity to maintain a predetermined configuration of said plasma.

16. The method of claim 13 wherein the frequency and amplitude of said electromagnetic wave are automatically varied by:
   sensing the field at each of a plurality of points adjacent said wall of said cavity to produce a plurality of field dependent signals,
   comparing predetermined ones of said field dependent signals,
   generating a control signal from said comparison of said predetermined ones of said field dependent signals,
   modifying said electromagnetic energy applied to said container responsive to said control signal to maintain said plasma in a predetermined configuration.

17. A method for confining and heating an ionized plasma which comprises:
   a. feeding electromagnetic energy independently to each of a plurality of feed points on a container to establish a circularly polarized standing electromagnetic wave in the TE mode,
   b. introducing gas into said container to a density from about $10^{13}$ to $10^{14}$ atoms per cubic centimeter to become ionized by said energy to form a plasma,
   c. thereafter feeding electromagnetic energy independently to each of a plurality of feed points on said container to establish a standing electromagnetic wave in the TM mode,
   whereby the total E field of said waves is substantially parallel to said wall and passes through a minimum in the region enclosed by said wall, and whereby said plasma is substantially confined in said region.

18. The method of claim 17 further comprising:
   automatically varying the frequency and amplitude of said electromagnetic waves in response to collective motion of said plasma to nullify the effect of said collective motion upon said field.

19. The method of claim 17 wherein the frequency and amplitude of the electromagnetic energy fed independently to each of said plurality of feed points are automatically varied by:
   sensing the electromagnetic field at a plurality of predetermined points adjacent said wall of said container to produce a plurality of field dependent signals,
   generating a control signal in response to predetermined functions of said field dependent signals,
   in response to said control signal modifying said electromagnetic energy fed to said cavity at at least one of said feed points to maintain a predetermined configuration of said plasma.

20. The method of claim 17 further comprising:
   controlling the degree of elliptical polarization of said E field to control the heating of said plasma.

21. The method of claim 17 wherein said TM mode is about 90° out of phase with said TE mode, control of polarization of said E field effected by varying the amplitude of the electromagnetic wave of one of said modes.

22. The method of claim 17 further comprising:
automatically varying the frequency and amplitude of the electromagnetic wave responsive to the motion of the plasma.

23. The method of claim 17 further comprising:
controlling the amount of heating of said plasma by varying the degree of ellipticity of the polarized standing wave.

24. A method for continuously confining and heating an ionized plasma comprising:
evacuating a chamber of toroidal configuration and preselected volume in which there is a system characteristic length of about one meter, applying electromagnetic energy as combined TE and TM modes at a plurality of spaced points along the wall of said chamber to produce a circularly polarized standing electromagnetic wave in said chamber, where the E field of said wave passes through a minimum within said chamber and is substantially parallel to the wall of said chamber, and introducing a low molecular weight gas into said chamber to satisy the relationship $$\frac{\ln g}{54\gamma} \left(\frac{\omega}{\omega_p}\right)^2 = 1 \text{ where } \gamma = \frac{\lambda}{2\pi} \left(\frac{\omega}{\omega_p}\right) \frac{S}{V}.$$

S being the surface area of said chamber and V being the volume of said chamber.

* * * * *